US010339640B2

(12) United States Patent
Koizumi

(10) Patent No.: US 10,339,640 B2
(45) Date of Patent: Jul. 2, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Tatsuro Koizumi, Niiza (JP)

(73) Assignee: Canon Kabushiki Kaisha, Tokyo (JP)

(*) Notice: Subject to any disclaimer, the term of this patent is extended or adjusted under 35 U.S.C. 154(b) by 47 days.

(21) Appl. No.: 15/669,776

(22) Filed: Aug. 4, 2017

(65) Prior Publication Data

US 2018/0061024 A1 Mar. 1, 2018

(30) Foreign Application Priority Data

Aug. 26, 2016 (JP) ................................. 2016-165671

(51) Int. Cl.
  *G06K 9/00* (2006.01)
  *G06T 5/00* (2006.01)
  (Continued)

(52) U.S. Cl.
  CPC .............. *G06T 5/009* (2013.01); *G06T 5/003* (2013.01); *G06T 5/20* (2013.01); *G06T 5/50* (2013.01);
  (Continued)

(58) Field of Classification Search
  CPC ....... G06T 5/00–009; G06T 5/10; G06T 5/20; G06T 5/50; G06T 7/002;
  (Continued)

(56) References Cited

U.S. PATENT DOCUMENTS 8,447,129 B2* 5/2013 Arrasmith ............... H04N 5/225
  382/131
10,074,189 B2* 9/2018 Koizumi ................. G06T 7/248
  (Continued)

FOREIGN PATENT DOCUMENTS

JP      03095686 A    4/1991
JP      2012182625 A  9/2012
JP      2015146192 A  8/2015

OTHER PUBLICATIONS

Berthold K.P. Horn and Brian G. Schunck. Determining Optical Flow. 1981. pp. 185-203. vol. 17. Artificial Intelligence Laboratory, Massachusetts Institute of Technology, Cambridge, MA.

*Primary Examiner* — Jose L Couso
(74) *Attorney, Agent, or Firm* — Canon U.S.A., Inc. IP Division

(57) ABSTRACT

An image processing apparatus includes an acquisition unit, first and second correction units, first and second calculation units, and a determination unit. The acquisition unit acquires image data pieces obtained by temporally successively capturing images of an object. The first correction unit acquires first correction data by performing fluctuation correction on processing target image data using temporally neighboring image data pieces among the acquired image data pieces. The first calculation unit calculates, as first displacement data, an amount of displacement between reference and the processing target image data or the first correction data. The determination unit determines a moving object region. The second calculation unit calculates second displacement data by interpolating the first displacement data in the determined moving object region based on the first displacement data or the first correction data. The second correction unit corrects based on the second displacement data to obtain second correction data.

13 Claims, 24 Drawing Sheets

(51) Int. Cl.
- *G06T 7/246* (2017.01)
- *G06T 5/20* (2006.01)
- *G06T 5/50* (2006.01)
- *G06T 7/269* (2017.01)

(52) U.S. Cl.
CPC .............. *G06T 7/246* (2017.01); *G06T 7/269* (2017.01); *G06T 2207/10016* (2013.01); *G06T 2207/20024* (2013.01); *G06T 2207/20182* (2013.01); *G06T 2207/20201* (2013.01); *G06T 2207/30232* (2013.01)

(58) Field of Classification Search
CPC .............. G06T 7/20–285; G06T 3/4038; G06T 2207/10016; G06T 2207/20016; G06T 2207/30232; G06T 2207/20024; G06T 2207/20182; G06T 2207/20201; G06T 2207/10021; G06T 2207/30192; G06T 2207/30241; G06T 2207/30196; G06T 2207/101052; G06K 9/00791; G06K 9/2018; H04N 5/23251; H04N 5/23264; H04N 5/23267; H04N 5/23239; H04N 5/23254; H04N 5/357; G01W 1/02; G01W 2201/003; G08G 5/0091; G08B 13/19608; G08B 13/19663; G08B 13/187; G08B 13/19602

See application file for complete search history.

(56) References Cited

U.S. PATENT DOCUMENTS

| | | | |
|---|---|---|---|
| 2014/0125860 A1* | 5/2014 | Tofsted | G06T 5/001 348/349 |
| 2015/0161773 A1* | 6/2015 | Takahashi | H04N 5/2171 382/173 |
| 2015/0228085 A1* | 8/2015 | Komiya | G06T 7/20 382/107 |
| 2015/0332443 A1* | 11/2015 | Yamada | G06T 5/002 382/274 |
| 2016/0006936 A1* | 1/2016 | Hattori | H04N 5/23267 382/166 |
| 2016/0171664 A1* | 6/2016 | Komiya | G06T 5/003 382/275 |
| 2017/0124685 A1* | 5/2017 | Yamada | G06T 5/50 |

* cited by examiner

IMAGE PROCESSING APPARATUS, IMAGE PROCESSING METHOD, AND STORAGE MEDIUM

BACKGROUND OF THE INVENTION

Field of the Invention

The disclosed information relates to image processing apparatuses, image processing methods, and storage media.

Description of the Related Art

When moving images are captured with a video camera, a monitoring camera, etc., video images of the captured moving images can fluctuate due to an effect of atmospheric turbulence. This phenomenon occurs when light rays are irregularly refracted due to non-uniform atmospheric temperature and density distributions and changes therein. The fluctuations in the video images cause the shapes of objects in the captured video images to change irregularly both spatially and temporally from their original shapes. The phenomenon can decrease visibility of the video images or can cause erroneous detection in a monitoring camera system configured to perform automatic detection.

A technique for correcting fluctuations in video images is discussed in Japanese Patent Application Laid-Open No. 2012-182625 in which when distortions can occur in captured images due to atmospheric turbulence, a plurality of images of one object is successively captured, and the plurality of captured images is averaged to correct distortions.

Further, Japanese Patent Application Laid-Open No. 03-095686 discusses a technique in which a fluctuation in time-series successive images is extracted as a motion vector between the images, the motion vector is tracked to obtain a center of the fluctuation, and a partial image or pixel to be an origin of the fluctuation is rearranged in the central position.

In the fluctuation correction techniques discussed in Japanese Patent Application Laid-Open Nos. 2012-182625 and 03-095686, if captured images contain a moving object, the motion of the object is erroneously detected as a fluctuation, and this causes a deterioration in image quality.

In response to the issue, Japanese Patent Application Laid-Open No. 2015-146192 discusses a method in which motion information about a moving object is acquired using pixel values of the moving object in images that are temporally neighboring a correction target image, and motion compensation is performed.

However, in the fluctuation correction technique discussed in Japanese Patent Application Laid-Open No. 2015-146192, only the temporally neighboring images can be used in the processing in order to avoid image deteriorations in moving object regions. Thus, long-period fluctuations cannot be corrected and thus remain.

SUMMARY OF THE INVENTION

The disclosed information is directed to a technique for favorably correcting long-period fluctuations in image data containing a moving object.

According to an aspect of the present invention, an image processing apparatus includes an acquisition unit configured to acquire a plurality of pieces of image data obtained by temporally successively capturing images of an object, a first correction unit configured to acquire first correction data by performing fluctuation correction on processing target image data using a plurality of pieces of temporally neighboring image data among the plurality of pieces of image data acquired by the acquisition unit, a first calculation unit configured to calculate as first displacement data an amount of displacement between reference image data and the processing target image data or the first correction data, a determination unit configured to determine a moving object region contained in the plurality of pieces of image data, a second calculation unit configured to calculate second displacement data by interpolating the first displacement data in the moving object region determined by the determination unit based on the first displacement data or the first correction data, and a second correction unit configured to correct the processing target image data or the first correction data based on the second displacement data to obtain second correction data.

Further features of the present invention will become apparent from the following description of embodiments with reference to the attached drawings.

DESCRIPTION OF THE EMBODIMENTS

Various embodiments will be described in detail below with reference to the drawings. It is to be noted that the following embodiments are merely examples for implementing the present invention and can be appropriately modified or changed depending on individual constructions and various conditions of apparatuses to which the present invention is applied. Thus, the present invention is in no way limited to the following embodiment. Further, not every combination of features described in the embodiments is always essential to a technical solution of the invention.

<Entire Configuration of Image Capturing Apparatus>

In an image capturing apparatus according to a first embodiment, fluctuation correction processing is performed on processing target image data using a plurality of pieces of temporally neighboring image data among a plurality of pieces of temporally successively captured image data to obtain first correction data. Further, in the image capturing apparatus, an amount of displacement between reference image data and the processing target image data or the first correction data is calculated as first displacement data, and a moving object region contained in the plurality of pieces of image data is determined.

Further, in the image capturing apparatus, the first displacement data of the determined moving object region is interpolated based on the first displacement data or the first correction data to calculate second displacement data. Further, in the image capturing apparatus, the processing target image data or the first correction data is corrected based on the second displacement data to obtain second correction data.

The first correction data contains at least one of fluctuation-corrected image data, which is obtained by performing fluctuation correction processing on the processing target image data, and displacement data indicating an amount of displacement caused by fluctuation.

Figure 1:
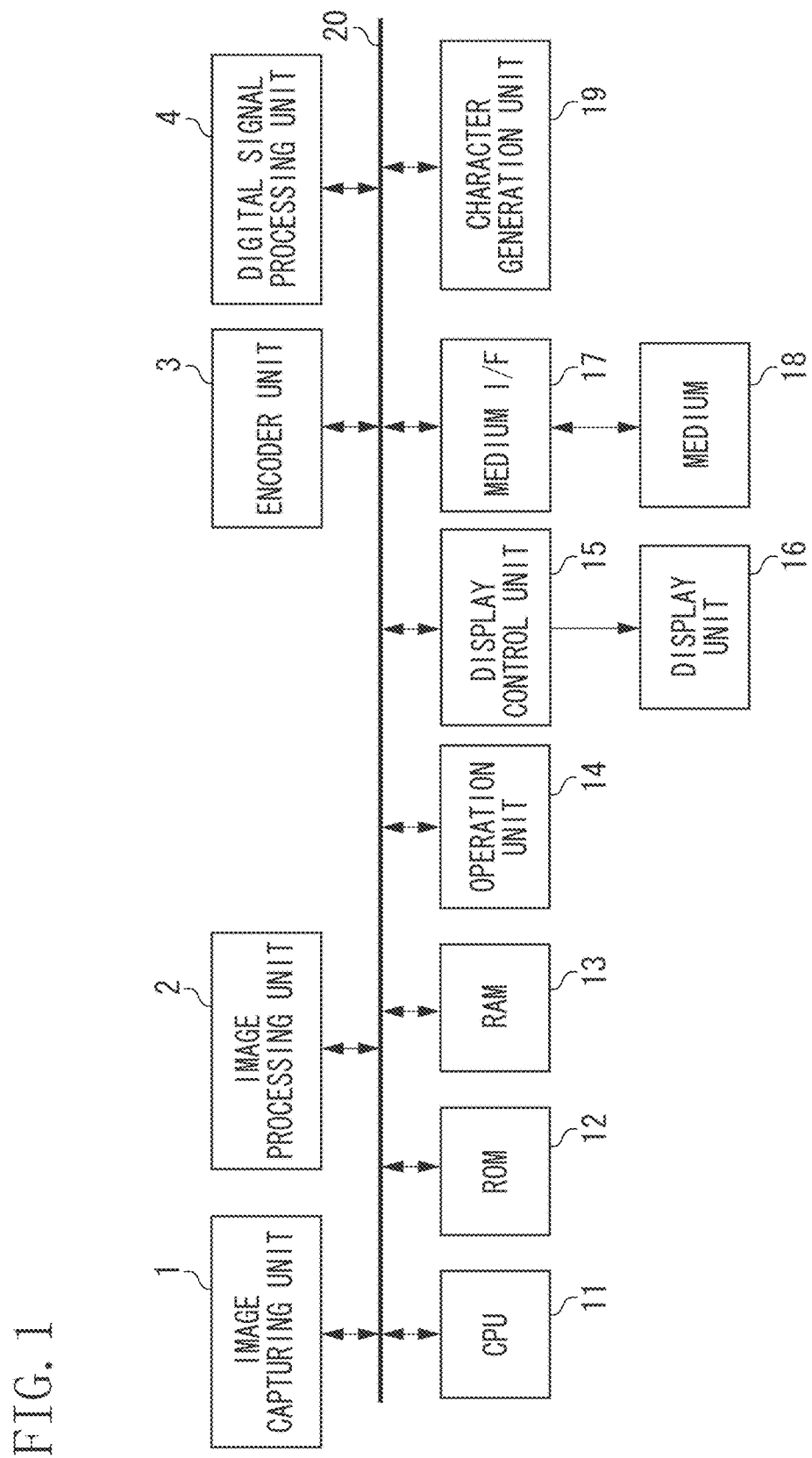
FIG. 1 is a block diagram illustrating an example of the configuration of an image capturing apparatus according to a first embodiment.

FIG. 1 is a block diagram illustrating an example of the configuration of the image capturing apparatus according to the present embodiment.

The image capturing apparatus includes an image capturing unit 1 configured to capture an object and output image data, an image processing unit 2 configured to perform data processing on image data, an encoder unit 3 configured to encode image data, and a digital signal processing unit 4 configured to perform signal processing on image data.

The image capturing unit 1 repeats a process of converting an image formed by an optical system into image data with an image capturing element to acquire a plurality of pieces of temporally successively captured object. Details will be described below.

The image processing unit 2 performs fluctuation correction processing on the plurality of pieces of image data acquired by the image capturing unit 1. Details will be described below. The encoder unit 3 performs encoding processing on image data generated as a result of the fluctuation correction processing performed by the image processing unit 2. The digital signal processing unit 4 performs processing such as luminance value adjustment and defective pixel interpolation on the image data acquired by the image capturing unit 1. The processing is performed before the image processing unit 2 performs processing.

Further, the image capturing apparatus includes a central processing unit (CPU) 11, a read-only memory (ROM) 12, a random access memory (RAM) 13, an operation unit 14, a display control unit 15, a display unit 16, a medium interface (I/F) 17, a medium 18, a character generation unit 19, and a bus 20.

The CPU 11 is involved in entire processing of each component. The CPU 11 sequentially reads instructions stored in the ROM 12 or the RAM 13, interprets the read instructions, and executes processing according to a result of the interpretation. Further, the ROM 12 and the RAM 13 provide the CPU 11 with a necessary program, data, work area, etc. for the processing. The operation unit 14 includes buttons and mode dials and receives user instructions input via the buttons and mode dials.

The character generation unit 19 generates characters, graphics, etc.

The display control unit 15 controls a display on the display unit 16. A liquid crystal display is generally and widely used as the display unit 16. The display unit displays captured image data and characters received from the character generation unit 19 and the display control unit 15. Further, the display unit 16 can include a touchscreen function. In this case, a user instruction via a touchscreen can be treated as input to the operation unit 14.

The medium I/F 17 is an interface for connecting a personal computer (PC) and other mediums (e.g., hard disk, memory card, CompactFlash (CF) card, secure digital (SD) card, universal serial bus (USB) memory) 18. Image data encoded by the encoder unit 3 is output via the medium I/F 17. The bus 20 functions as a channel via which the components transmit and receive data and processing instructions to and from each other.

The image capturing apparatus can further include a component other than the above-described components, but the present embodiment is not focused on such a component, so description thereof is omitted.

<Configuration of Image Capturing Unit>

Figure 2:
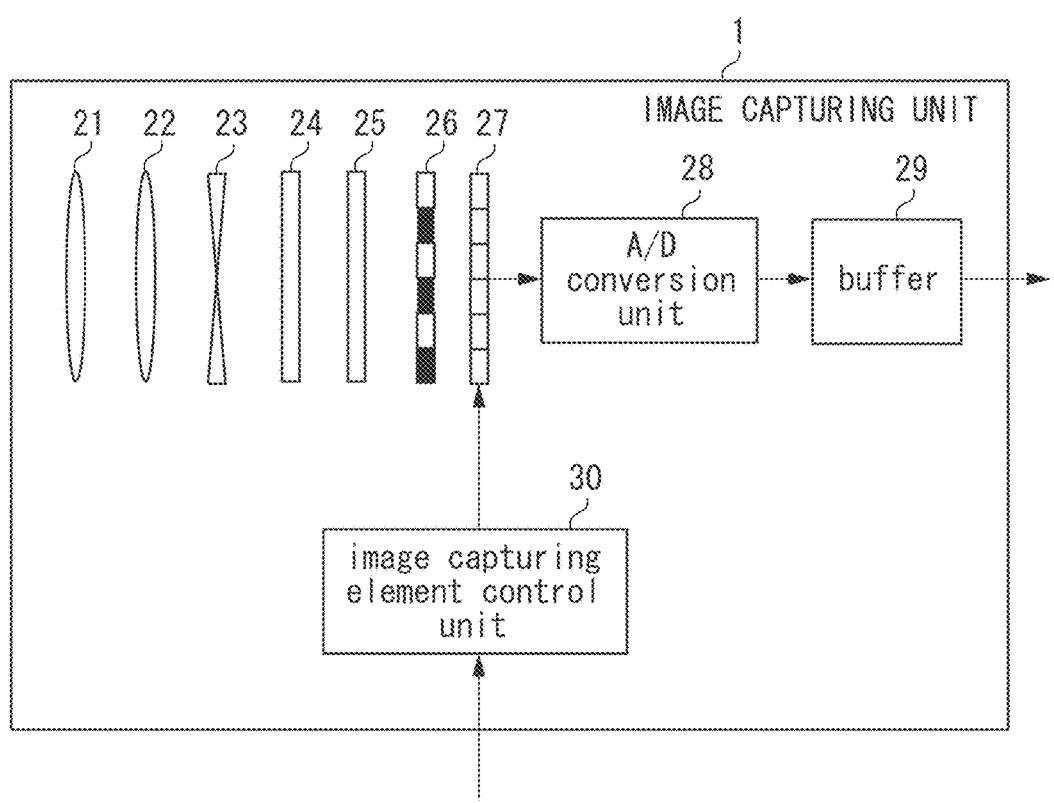
FIG. 2 is a block diagram illustrating an example of the configuration of an image capturing unit.

The following describe an example of the configuration of the image capturing unit 1 with reference to a block diagram illustrated in FIG. 2.

The image capturing unit 1 includes lenses 21 and 22, which form an imaging optical system, a diaphragm 23, an infrared (IR) cut filter 24, a low-pass filter 25, a color filter 26, an image capturing element 27, an analog/digital (A/D) conversion unit 28, a buffer 29, and an image capturing element control unit 30.

Light from an object is transmitted through the diaphragm 23, the IR cut filter 24, the low-pass filter 25, and the color filter 26 and then focused onto the image capturing element 27 by the imaging optical system.

The above-described configuration of the optical system is a simplified example for description, and the optical system can have any configuration having a function of forming an object on an image capturing element. Further, while color image acquisition is described above, an image to be acquired can be a monochrome image, an image having pixels of four or more colors, or an image with pixels each having a different exposure. Further, a mechanism such as autofocusing mechanism or zooming mechanism can be included.

The image capturing element control unit 30 controls the image capturing element 27 to capture an object according to an instruction from the CPU 11 via the bus 20.

The image capturing element 27 and the A/D conversion unit 28 correspond to image sensors such as complementary metal oxide semiconductor (CMOS) image sensors. The image capturing element 27 is arranged in two-dimensional lattice form and converts formed images into electric signals. The A/D conversion unit 28 converts into digital signals information about images converted to electric signals. Information (electric signals) about images converted to digital signals by the A/D conversion unit 28 is stored in the buffer 29 as image data.

Image capturing is successively performed, and image data stored in the buffer 29 is sequentially transmitted to the image processing unit 2 via the bus 20.

<Principle of Fluctuation Correction using Neighborhood Image>

The following describes a principle of a correction method on which the present embodiment is based, i.e., a method of correcting fluctuations in successively captured images using temporally neighboring images without breaking an object which is moving (moving object).

As to the method of correcting fluctuations in successively captured images using temporally neighboring images, there are a method in which a time-series mean filter or median filter is applied to time-series pixel values of respective pixels and a method in which a time-series filter is applied to time-series displacements of respective pixels to change the shape of an image. The following describes principles of the two methods.

First, the principle of the method in which a time-series filter is applied to time-series displacements of respective pixels to change the shape of an image will be described below.

Figure 3A:
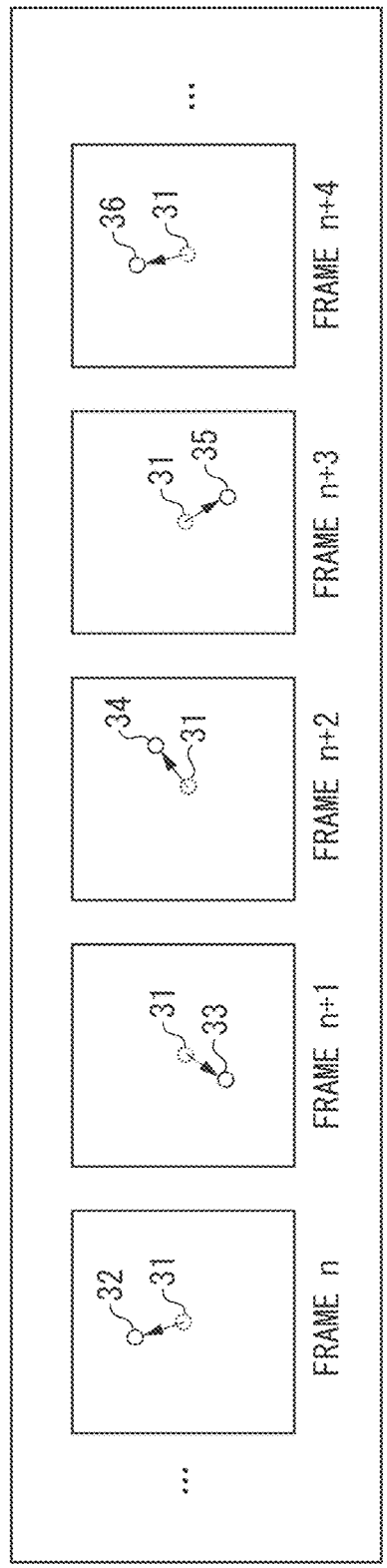
FIGS. 3A and 3B illustrate displacements of images due to fluctuations.
Figure 3B:
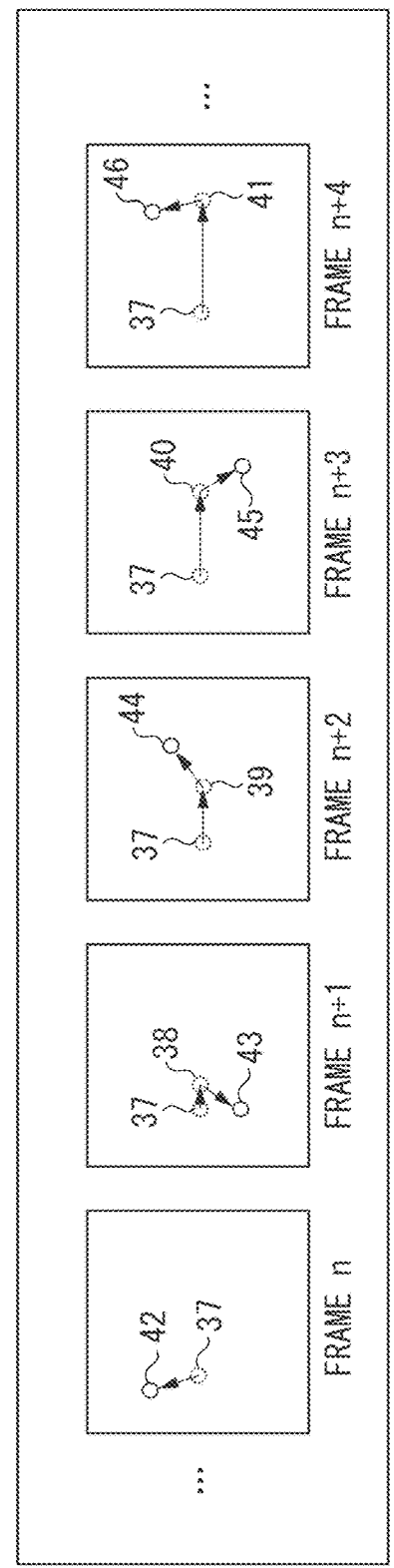

FIGS. 3A and 3B schematically illustrate displacements caused by fluctuations. Hereinafter, time-series image data forming a moving image (video image) will be referred to as frames.

FIG. 3A illustrates an example of displacements in a still region in which an object is at rest. A mark 31 indicates a true position of a point on an object in which the point is supposed to appear if no fluctuation occurs. Marks 32 to 36 indicate positions in which the point corresponding to the mark 31 appears in frames n to n+4. The position of the point an image of which is supposed to be captured in the position of the mark 31 is changed due to fluctuations, so the image of the point is captured in displaced positions of the marks 32 to 36 in the respective frames.

FIG. 3B illustrates displacements in a moving object region in which an object is moving. Marks 37 to 41 each indicate a true position of a point on an object in which the point is supposed to appear in frames n to n+4 if no fluctuation occurs, and the true position in one frame is moved rightward in the subsequent frame. Marks 42 to 46 indicate positions in which images of the points corresponding to the marks 37 to 41 are captured in the frames n to n+4. The positions of the points images of which are supposed to be captured in the positions of the marks 37 to 41 are changed due to fluctuations, so the images of the points are captured in displaced positions of the marks 42 to 46 in the respective frames.

Figure 4A:
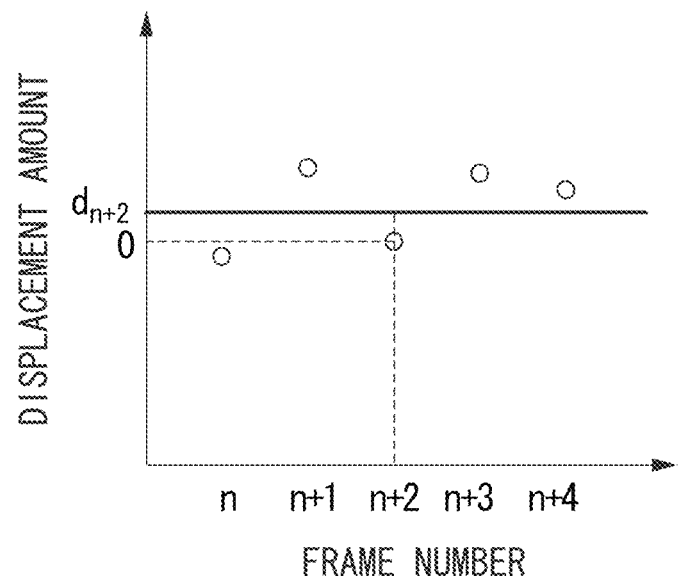
FIGS. 4A and 4B each illustrate a principle of fluctuation correction using displacement filtering.
Figure 4B:
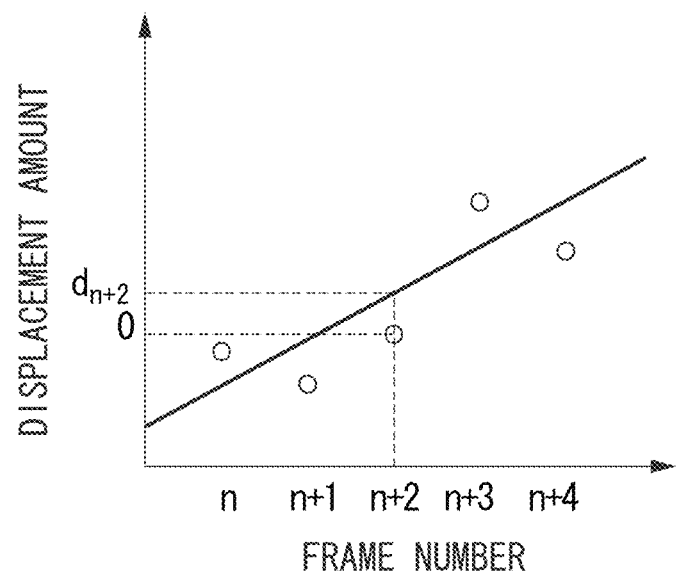

A true position of an object in a case in which no fluctuation occurs can be estimated by determining as a random motion a positional change caused by fluctuation as illustrated in FIGS. 3A and 3B and then performing fitting using a function. FIGS. 4A and 4B each illustrate an example of an estimation of a true position of an object based on fitting.

FIG. 4A illustrates an example of an estimation of a true position of an object in a case of a still region. In FIG. 4A, positions in which a point on an object appears in respective frames n to n+4 are specified as a displacement amount (amount of displacement) based on the position of the point in the frame n+2 as a reference position. In FIG. 4A, an example in which a true position is estimated based on the fitting to a linear function of a relationship between time and displacement amount. A horizontal real line in a graph indicates an estimated true position, and since the region is a still region, there is no variation in displacement amount between the frames. To correct a fluctuation of a point of interest in the frame n+2, the position of a pixel may be moved by $d_{n+2}$. The true position estimation based on the fitting and the correction are performed on each pixel of a correction target image to correct fluctuations in entire image data.

FIG. 4B illustrates an example of an estimation of a true position of an object in a case of a moving object region, and a displacement amount is plotted as in FIG. 4A. Since the region is a moving object region, a true position obtained based on the fitting slopes to reflect a motion of a point of interest. To correct a fluctuation of the point of interest in the frame n+2, the position of a pixel may be moved by $d_{n-2}$, as in the above-described case.

The method requires calculation of a displacement amount, and use of a temporally distant frame with a large displacement of a moving object can result in unsuccessful calculation of the displacement amount to break the moving object. Thus, a temporally neighboring image needs to be used in the correction processing.

Figure 5A:
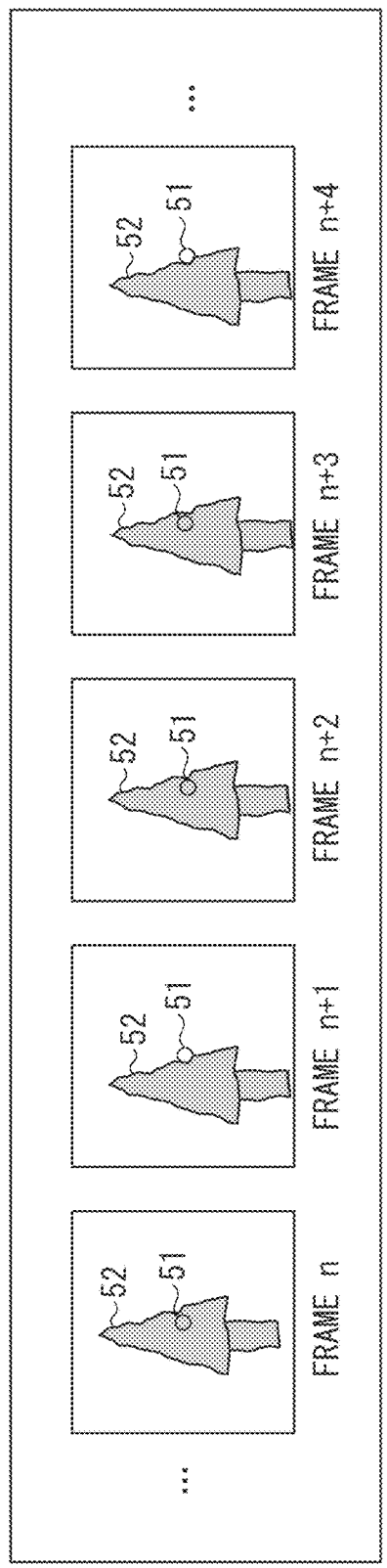
FIGS. 5A and 5B illustrate changes in pixel values due to displacements and a principle of fluctuation correction using the mean of the pixel values.
Figure 5B:
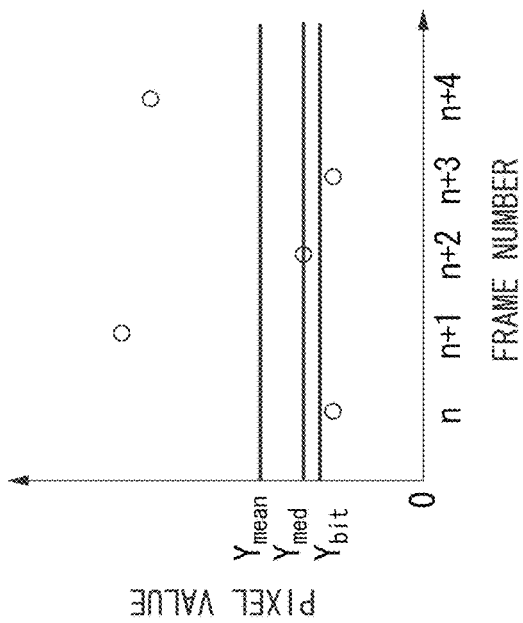

Next, the principle of the method in which a time-series mean filter or median filter is applied to pixel values of neighborhood frames to correct fluctuations will be described below. FIGS. 5A and 5B schematically illustrate changes in pixel values that are caused by fluctuations.

In the present embodiment, the principle will be described in which a pixel value of a pixel position 51 in fluctuation-corrected image data is calculated using frames n to n+4, with reference to FIG. 5A as an example.

In FIG. 5A, images of an object 52 are captured with changes in shape due to fluctuations in the respective frames n to n+4. The pixel value in the pixel position 51 is changed in each frame as the position of a captured image of an object is changed in each frame due to fluctuations.

FIG. 5B illustrates changes in the pixel value in each frame. Changes in shape due to fluctuations have a characteristic that displacements occur around a true position of an object with the true position being the center, so an original pixel value appears as a mode value. Thus, a mean value $Y_{mean}$, a median value $Y_{med}$, or a pixel value $Y_{bil}$ calculated using a bilateral filter is calculated as a pixel value of a fluctuation-corrected image to correct the fluctuations. In the case in which there is a moving object, a favorable result is obtained if the processing is performed after the moving object is aligned. Obviously, the processing can be performed instantly if the amount of movement is assumed to be small.

In this method, use of a temporally distant frame with a large displacement of a moving object can result in unsuccessful alignment of the moving object or can lead to a decrease in frequency of appearance of a pixel value of the moving object to result in disappearance of the moving object from a correction result. Thus, the processing needs to be performed using temporally neighboring image data.

<Principle of Remaining Fluctuation Correction>

In the above-described fluctuation correction using temporally neighboring image data, a long-period fluctuation between frames exceeding the number of frames referenced in the correction processing can remain.

In the present embodiment, a remaining fluctuation amount (remaining displacement amount) of a moving object region is generated by performing interpolation processing based on data on other regions (still region, etc.) using a characteristic that a temporally long-period fluctuation is temporally long period.

Figure 6:
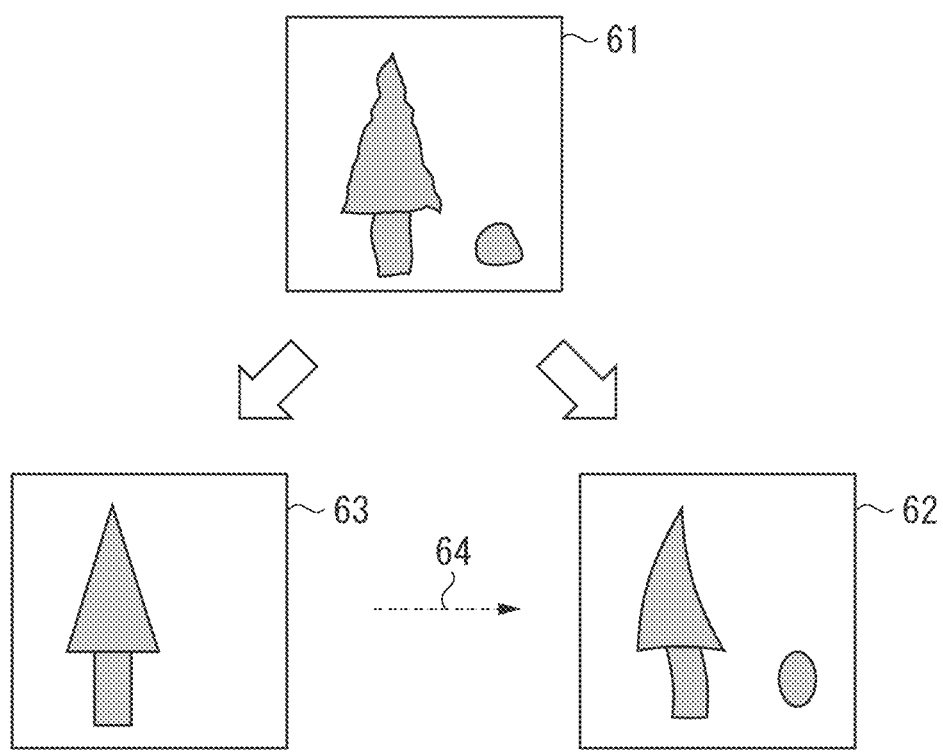
FIG. 6 conceptually illustrates remaining fluctuation correction processing.

FIG. 6 schematically illustrates a concept of remaining fluctuation correction. In the present embodiment, a fluctuation-corrected image 62 is generated from an input image 61 using the above-described neighborhood image fluctuation correction. Further, fluctuations are corrected using a larger number of frames than the frames used in the neighborhood image fluctuation correction to generate a reference image 63 by, for example, averaging all input images.

At this time, since the fluctuation correction processing is performed using a larger number of frames than the frames used to generate the fluctuation-corrected image 62, the moving object region can be broken or disappear but almost no fluctuation remains in the reference image 63.

Further, the reference image 63 and the fluctuation-corrected image 62 are aligned to calculate a displacement amount 64. Since the moving object region is broken or disappears on the reference image 63, calculation of a displacement amount of the moving object region (moving object region) fails, but displacement amounts of other regions (still regions) are correctly calculated. Specifically, the displacement amount 64 is calculated to allow calculation of a remaining fluctuation of a moving object region (moving object region) other than the moving object region. The remaining fluctuation is temporally and spatially low frequency, so moving object region information can be calculated using interpolation. Based on the displacement amount (remaining displacement amount) thus calculated using interpolation, the fluctuation-corrected image 62 is deformed (resampled) to coincide with the reference image 63 to correct the remaining fluctuation of the moving object region.

<Configuration of Image Processing Unit 2>

Figure 7:
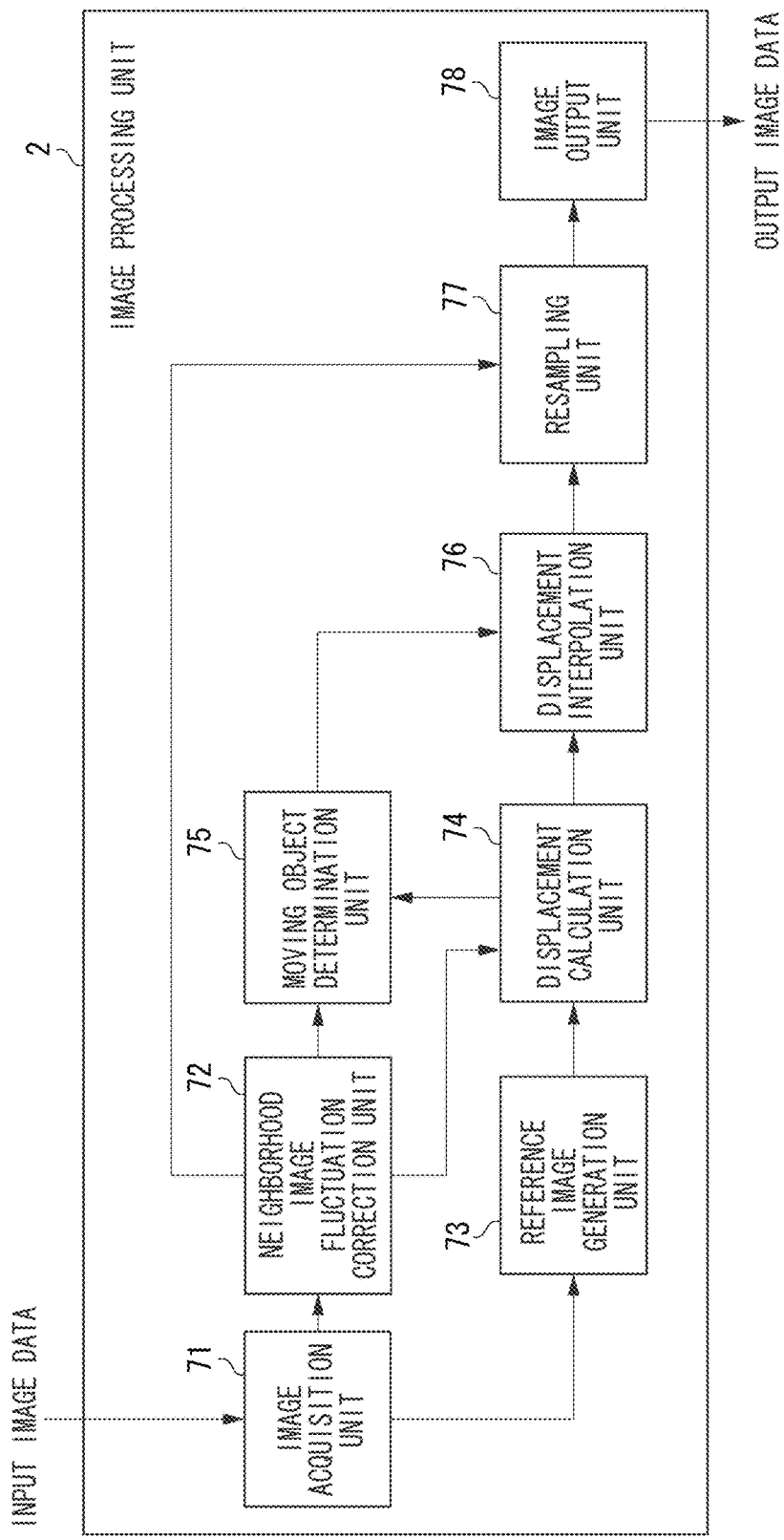
FIG. 7 is a block diagram illustrating an example of the configuration of an image processing unit according to the first embodiment.

The following describes an example of the configuration of the image processing unit 2 configured to execute the above-described processing, with reference to a block diagram illustrated in FIG. 7.

The image processing unit 2 includes an image acquisition unit 71, a neighborhood image fluctuation correction unit 72, a reference image generation unit 73, a displacement calculation unit 74, a moving object determination unit 75, a displacement interpolation unit 76, a resampling unit 77, and an image output unit 78.

The image acquisition unit 71 acquires, one frame each time via the bus 20, a plurality of pieces of image data captured successively by the image capturing unit 1.

The neighborhood image fluctuation correction unit 72 applies fluctuation correction using only a temporally neighboring image to the image data acquired by the image acquisition unit 71, and generates fluctuation-corrected image data and moving speed data about the object. Details will be described below.

The reference image generation unit 73 generates image data (reference image data) to be used as a reference in the alignment for an estimation of a fluctuation (remaining displacement amount) remaining in the fluctuation-corrected image data generated by the neighborhood image fluctuation correction unit 72 from the image data acquired by the image acquisition unit 71.

In the present embodiment, the reference image data is generated by calculating a median value of each pixel of a larger number of pieces of image data, e.g., 100 pieces of previous image data acquired by the image acquisition unit 71, than the pieces of image data used to acquire the fluctuation-corrected image data by the neighborhood image fluctuation correction unit 72. In the present embodiment, any method can be used by which image data with a fluctuation on a still object being substantially at rest is generated using a larger number of pieces of image data than the image data referenced in the neighborhood image fluctuation correction processing. For example, a mean filter of each pixel or a time-series bilateral filter can be used. Specifically, the reference image data is generated by applying a filter to time-series pixel values of a plurality of pieces of image data. Alternatively, alignment is performed on one piece of image data to obtain a mean value of a motion, and an image is deformed such that each pixel is moved to an obtained position. Specifically, the reference image data is generated by applying a filter to time-series displacement amounts of a plurality of pieces of image data. Obviously, the number of pieces of image data to be referenced by the reference image generation unit 73 can be any number.

The displacement calculation unit 74 calculates an amount of displacement of each pixel between the reference image data generated by the reference image generation unit 73 and the fluctuation-corrected image data generated by the neighborhood image fluctuation correction unit 72. Details will be described below.

The moving object determination unit 75 determines a region on an image that contains a moving object, based on the fluctuation-corrected image data and the moving speed data generated by the neighborhood image fluctuation correction unit 72 and the displacement amount calculated by the displacement calculation unit 74, and generates moving object map data. Details will be described below.

The displacement interpolation unit 76 interpolates the displacement amount calculated by the displacement calculation unit 74 with respect to the region determined as containing a moving object in the moving object map data generated by the moving object determination unit 75. Details will be described below.

The resampling unit 77 resamples the fluctuation-corrected image data generated by the neighborhood image fluctuation correction unit 72 such that the fluctuation-corrected image data coincides with the reference image data, based on the displacement amount interpolated by the displacement interpolation unit 76. In the present embodiment, the resampling is performed using a bilinear method, bicubic method, etc. based on the assumption that the displacement calculation unit 74 calculates a displacement amount indicating a correspondence between pixels on the reference image data and positions on the fluctuation-corrected image data. The resampling unit 77 can use any method to perform resampling. Further, a reverse displacement amount may be calculated, and pixel values may be weighted-distributed to pixels neighboring corresponding positions and the distributed pixel values may be averaged.

The image output unit 78 outputs via the bus 20 output image data generated by the resampling unit 77.

<Outline of Processing Performed in Image Processing Unit 2>

Figure 8:
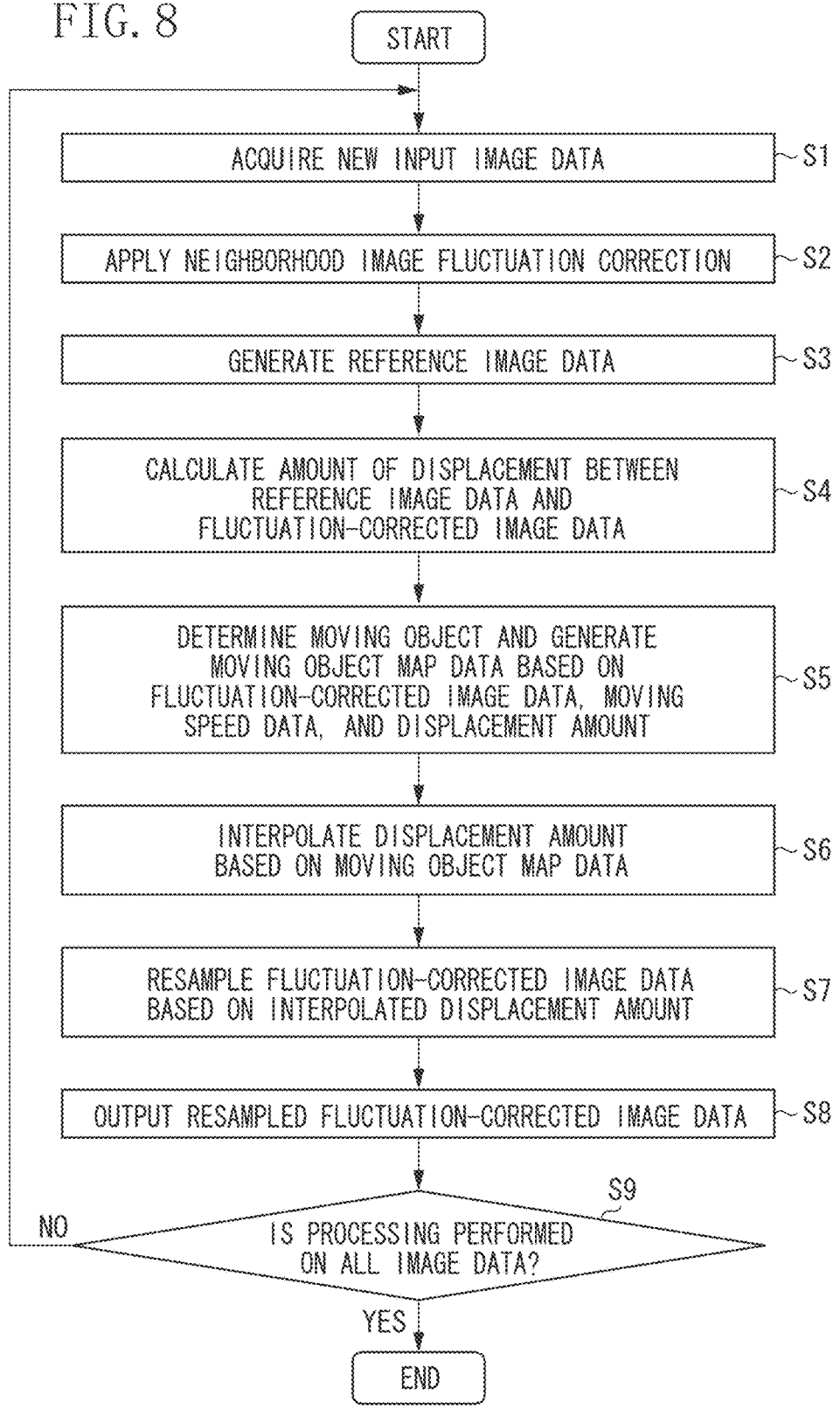
FIG. 8 is a flow chart illustrating image processing according to the first embodiment.

The following describes an example of an outline of processing performed in the image processing unit 2, with reference to FIG. 8. Details of processing performed in each step will be described below.

In step S1, the image acquisition unit 71 acquires via the bus 20 one new frame of image data captured by the image capturing unit 1.

In step S2, the neighborhood image fluctuation correction unit 72 performs fluctuation correction based on the image data acquired in step S1 to generate fluctuation-corrected image data and moving speed data about an object.

In step S3, the reference image generation unit 73 generates reference image data.

In step S4, the displacement calculation unit 74 calculates an amount of displacement between the reference image data generated in step S3 and the fluctuation-corrected image data generated in step S2.

In step S5, the moving object determination unit generates moving object map data based on the fluctuation-corrected image data and the moving speed data generated in step S2 and the displacement amount calculated in step S4.

In step S6, the displacement interpolation unit 76 interpolates the displacement amount calculated in the step S4 in a region determined as a moving object region on the moving object map data generated in step S5.

In step S7, the resampling unit 77 resamples the fluctuation-corrected image data generated in step S2 such that the fluctuation-corrected image data coincides with the reference image data based on the displacement amount interpolated in step S6.

In step S8, the image output unit 78 outputs as output image data the image data resampled in step S7.

<Configuration of Neighborhood Image Fluctuation Correction Unit and Details of Processing>

Figure 9:
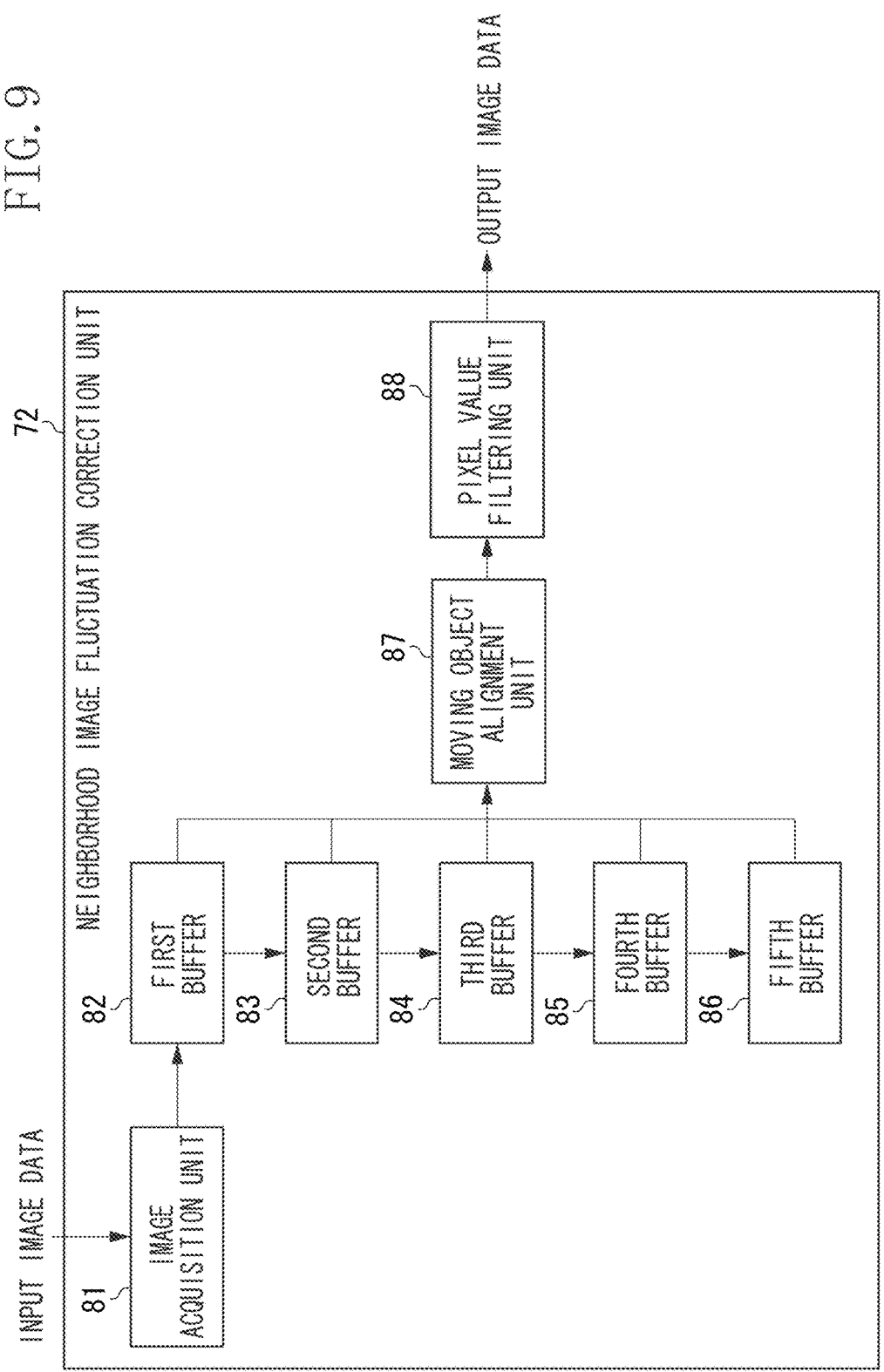
FIG. 9 is a block diagram illustrating an example of the configuration of a neighborhood image fluctuation correction unit using displacement filtering.
Figure 10:
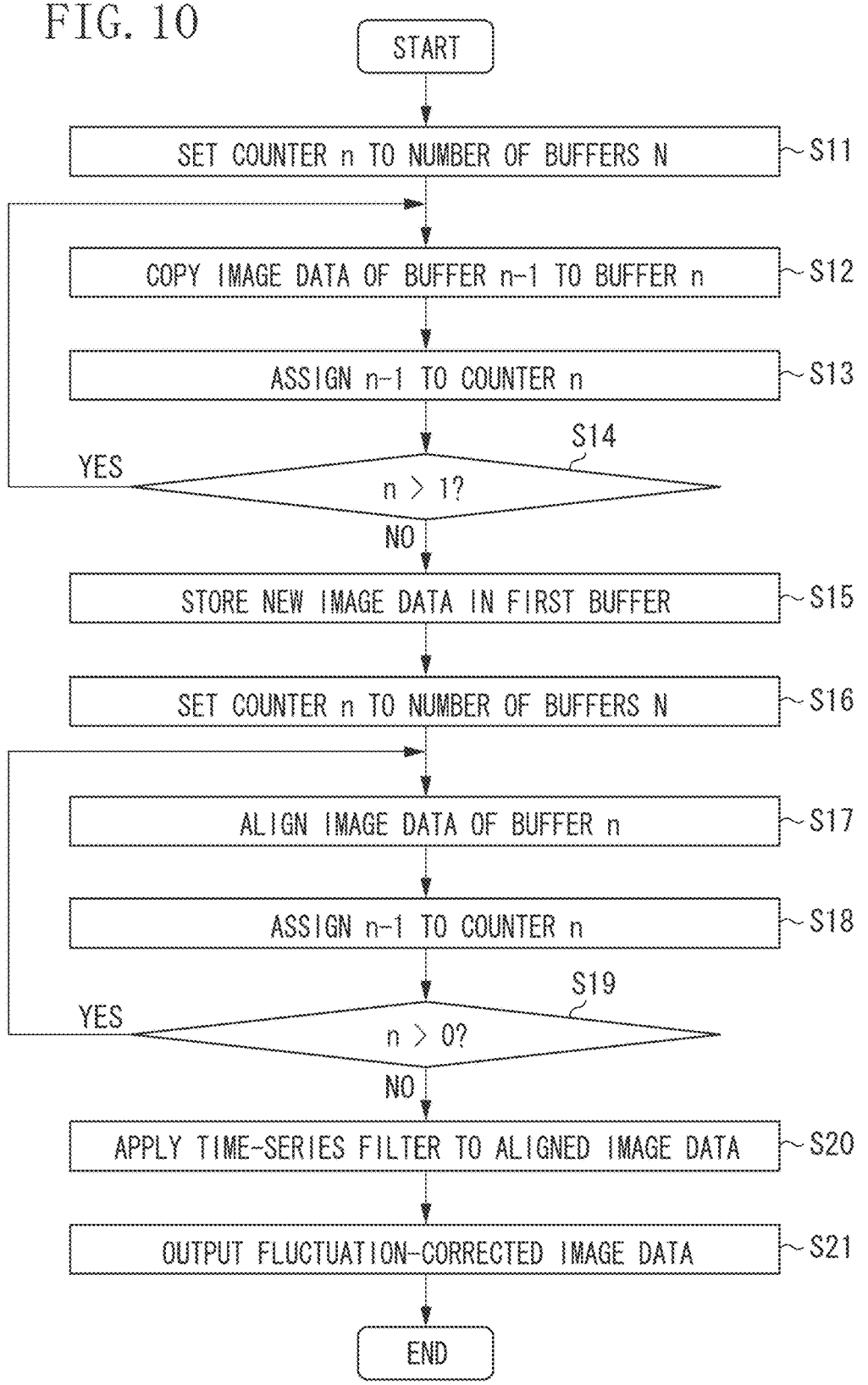
FIG. 10 is a flow chart illustrating neighborhood image fluctuation correction processing using displacement filtering.
Figure 11:
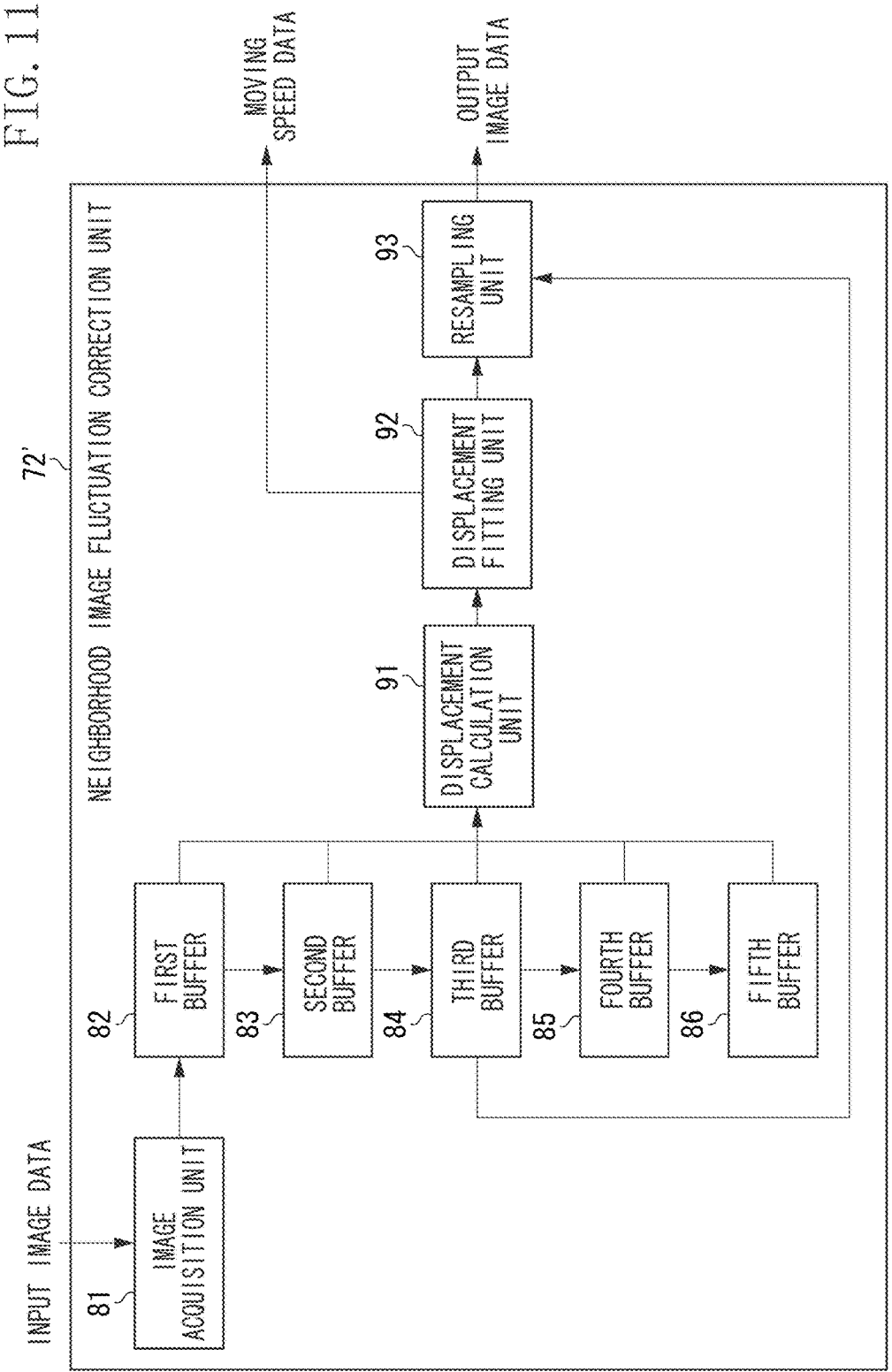
FIG. 11 is a block diagram illustrating an example of the configuration of a neighborhood image fluctuation correction unit using pixel value filtering.
Figure 12:
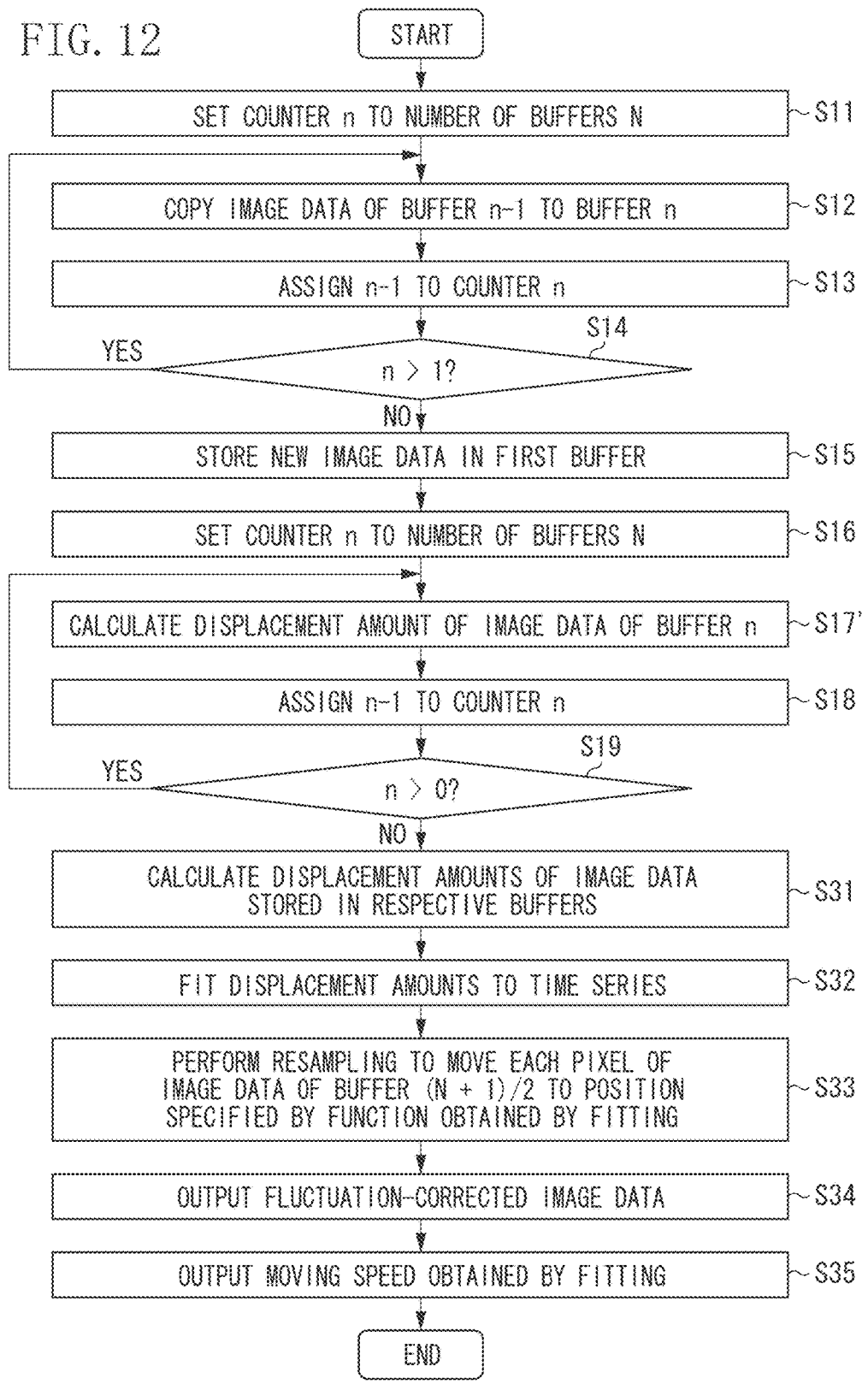
FIG. 12 is a flow chart illustrating neighborhood image fluctuation correction processing using pixel value filtering.

The following describes the configuration of the neighborhood image fluctuation correction unit 72 and an example of processing. FIGS. 9 and 10 illustrate an example of a fluctuation correction method in which filter processing is performed on pixel values. FIGS. 11 and 12 illustrate an example of a fluctuation correction method in which each image is deformed according to a position obtained by displacement fitting. While the latter method is employed in the present embodiment, either one of the methods can be used. Further, any other method by which a long-period fluctuation (remaining displacement amount) remains without breaking a moving object region can be used to correct fluctuations.

FIG. 9 illustrates an example of the configuration of the neighborhood image fluctuation correction unit 72 configured to perform fluctuation correction processing by performing filtering processing on pixel values using image data of five neighboring frames.

The neighborhood image fluctuation correction unit 72 includes an image acquisition unit 81, first to fifth buffers 82 to 86, a moving object alignment unit 87, and a pixel value filtering unit 88.

The image acquisition unit 81 acquires image data sequentially input from the image acquisition unit 71. The acquired image data is held in the first to fifth buffers 82 to 86. Immediately after being acquired, the acquired image data is first stored in the first buffer 82 and is moved to the next buffer each time new image data is input.

The moving object alignment unit 87 aligns and deforms the image data stored in each buffer such that the aligned and deformed image data coincides with the image data stored in the third buffer 84. In the present embodiment, any alignment method by which a moving object is deformed to substantially coincide can be used. For example, block matching or the like can be used. Further, a method in which no alignment is applied can be used, while use of the method can cause a moving object to blur.

The pixel value filtering unit 88 performs time-series filter processing on image data output from the moving object alignment unit 87 by calculating a mean value for each pixel, and generates fluctuation-corrected image data. The time-series filter processing can be performed using any method capable of correcting fluctuations, such as a method using a median filter, bilateral filter, etc. besides the mean filter.

FIG. 10 illustrates an example of a process of correcting fluctuations by performing filtering processing on pixel values of N neighboring frame images. In the present embodiment, N=5.

In step S11, the neighborhood image fluctuation correction unit 72 sets a counter n to the number of buffers N.

In step S12, the neighborhood image fluctuation correction unit 72 copies image data of a buffer n−1 to a buffer n. The buffers represent the buffers 82 to 86 in FIG. 9.

In step S13, the neighborhood image fluctuation correction unit 72 assigns n−1 to the counter n.

In step S14, the neighborhood image fluctuation correction unit 72 determines whether the counter n is larger than one. If the counter n is larger than one (YES in step S14), the processing returns to step S12 to repeat the process. On the other hand, if the counter n is not larger than one (NO in step S14), the processing proceeds to step S15. In steps S11 to S14, the image data stored in the fifth buffer 86 is discarded, and the image data stored in each of the first to fourth buffers 82 to 85 is copied to the next buffer.

In step S15, the image acquisition unit 81 acquires new image data and stores the acquired new image data in the first buffer 82.

In steps S16 to S19, the moving object alignment unit 87 aligns the image data stored in each buffer such that the image data coincides with the image data stored in a buffer (N+1)/2, i.e., the third buffer 84. In step S16, the neighborhood image fluctuation correction unit 72 sets the counter n to the number of buffers N.

In step S17, the moving object alignment unit 87 aligns the image data of the buffer n. In step S18, the neighborhood image fluctuation correction unit 72 assigns n−1 to the counter n.

In step S19, the neighborhood image fluctuation correction unit 72 determines whether the counter n is larger than zero. If the counter n is larger than zero (YES in step S19), the processing returns to step S17 to repeat the process. On the other hand, if the counter n is not larger than zero (NO in step S19), the processing proceeds to step S20.

In step S20, the pixel value filtering unit 88 performs time-series filter processing on the image data stored in each buffer to generate fluctuation-corrected image data.

In step S21, the pixel value filtering unit 88 outputs the fluctuation-corrected image data.

FIG. 11 illustrates an example of the configuration of a neighborhood image fluctuation correction unit 72' configured to perform fluctuation correction processing by deforming each image according to a position obtained by displacement fitting using image data of five neighboring frames.

The neighborhood image fluctuation correction unit 72' includes the image acquisition unit 81, the first to fifth buffers 82 to 86, a displacement calculation unit 91, a displacement fitting unit 92, and a resampling unit 93.

Functions of the image acquisition unit 81 and the first to fifth buffers 82 to 86 are similar to those in the example illustrated in FIG. 9.

The displacement calculation unit 91 calculates a displacement amount indicating a correspondence between pixels on the image data stored in the third buffer 84 and positions on the image data stored in each buffer. Details of the displacement amount calculation will be described below.

The displacement fitting unit 92 fits the displacement amount calculated by the displacement calculation unit 91 to time series. A function used in the fitting can be a zero-order function, i.e., mean, or a linear function or a higher-order function. Specifically, a filter is applied to time-series displacement amounts of a plurality of pieces of image data to generate displacement data which indicates an amount of displacement caused by fluctuations. Any method can be used by which a correspondence to a fluctuation-corrected position is calculated from a displacement amount of each image. In the present embodiment, a linear function is used, and a gradient of the linear function is used as a moving speed of a moving object to generate moving speed map data.

The resampling unit 93 performs resampling to move each pixel of the image data stored in the third buffer 84 to a position specified by the function calculated by the displacement fitting unit 92, and generates fluctuation-corrected image data.

FIG. 12 illustrates an example of a process of correcting fluctuations by deforming each image according to a position obtained by fitting a displacement amount using image data of N neighborhood frames. In the present embodiment, N=5.

Steps S11 to S19 are similar to those in FIG. 10.

In step S17' in FIG. 12, which corresponds to step S17 in FIG. 10, the displacement calculation unit 91 calculates a displacement amount of the image data of the buffer n.

In step S31, the displacement calculation unit 91 calculates the displacement amount of the image data stored in each buffer with respect to the image data stored in the buffer (N+1)/2, i.e., the third buffer 84.

In step S32, the displacement fitting unit 92 fits the displacement amount calculated by the displacement calculation unit 91 in step S31 to time series.

In step S33, the resampling unit 93 performs resampling to move each pixel of the image data stored in the buffer (N+1)/2, i.e., the third buffer 84, to a position specified by the function calculated by the displacement fitting unit 92, and generates fluctuation-corrected image data. In step S34, the resampling unit 93 outputs the fluctuation-corrected image data.

While the number of pieces of image data to be used is set to five frames and the processing is performed using temporally centrally located image data as a reference in the present embodiment, the number of pieces of image data to be used can be any number. Further, any of the image data can be used as a reference.

<Configuration of Displacement Calculation Unit and Details of Processing>

The displacement calculation unit 74 calculates a displacement amount from alignment reference image data to target image data.

In the present embodiment, the displacement calculation unit 74 calculates an amount of displacement between the target image data and the reference image data using a Horn-Schunck method discussed in "Determining optical flow", Horn, B. K. P. and Schunck, B. G., 1981, Artificial Intelligence, 17:185-203.

In the Horn-Schunck method, displacement amounts u and v that minimize an energy function E represented by formula (1) are obtained by repeating calculations. In formula (1), $I_x$ and $I_y$ denote respective derivatives of pixel values of the reference image data in x- and y-directions, and $I_t$ denotes a change in luminance between two images for which a displacement amount is to be calculated.

$$E = \iint [(I_x u + I_y v + I_t)^2 + \alpha^2 (\|\nabla u\|^2 + \|\nabla v\|^2)] dx dy \qquad (1)$$

The first term in the integral in formula (1) is a term obtained by expanding to the first order the condition that pixel values are constant between images for which a displacement amount is to be calculated, and the second term is a regularization term representing the condition that the displacement amount changes successively. The parameter α is a parameter for adjusting the intensity of the regularization. The larger the parameter α is, the smoother the changes in the displacement amount become. When formula (1) is solved using the Euler-Lagrange equation, formula (2) is obtained.

$$I_x(I_x u + I_y v + I_t) - \alpha^2 \Delta u = 0 \quad I_y(I_x u + I_y v + I_t) - \alpha^2 \Delta v = 0 \qquad (2)$$

When formula (3) representing the Laplacians of the displacement amounts u and v is substituted into formula (2), formula (4) is obtained. In formulas (3) and (4), a straight line (bar) above a symbol denotes a weighted mean in neighboring regions.

$$\Delta u = \bar{u} - u$$

$$\Delta v = \bar{v} - v \qquad (3)$$

$$(I_x^2 + \alpha^2) u + I_x I_y v = \alpha^2 \bar{u} - I_x I_t$$

$$I_x I_y u + (I_y^2 + \alpha^2) v = \alpha^2 \bar{v} - I_y I_t \qquad (4)$$

Since Formula (4) contains the weighted means of the displacement amounts in the neighboring regions, u and v in all pixel positions have a connection, so formula (4) is difficult to solve analytically. Thus, a solution of formula (4) is approximately obtained by repeating computation of formula (5). In formula (5), k denotes the number of times the computation is repeated, and $u^k$ and $v^k$ are values of displacement amounts obtained in the k-th computation.

$$u^{k+1} = \bar{u}^k - \frac{I_x(I_x \bar{u}^k + I_y \bar{v}^k + I_t)}{\alpha^2 + I_x^2 + I_y^2} \qquad (5)$$

$$v^{k+1} = \bar{v}^k - \frac{I_y(I_x \bar{u}^k + I_y \bar{v}^k + I_t)}{\alpha^2 + I_x^2 + I_y^2}$$

Figure 13:
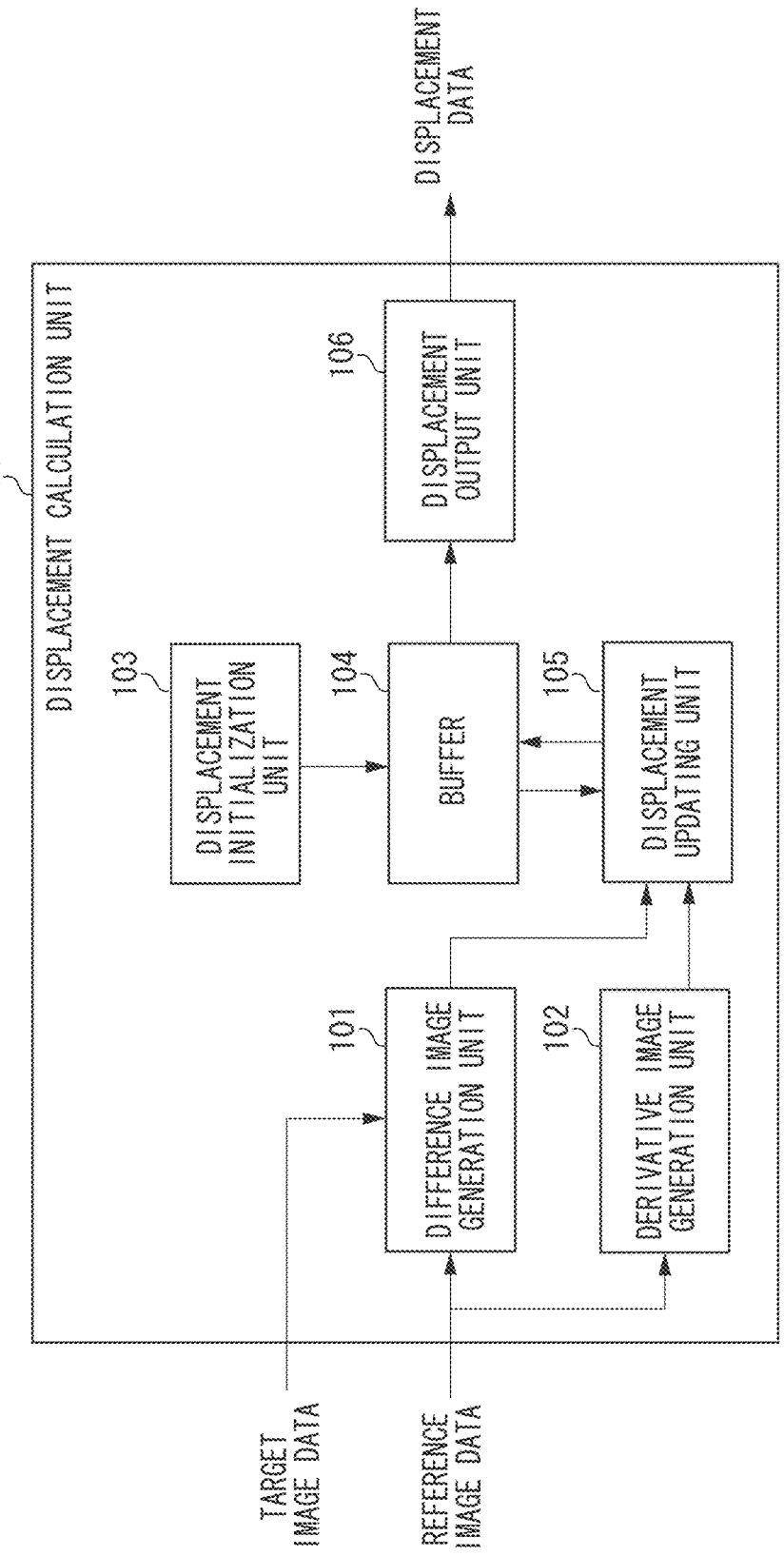
FIG. 13 is a block diagram illustrating an example of the configuration of a displacement calculation unit.

Next, the following describe an example of the configuration of the displacement calculation unit 74, with reference to a block diagram illustrated in FIG. 13.

The displacement calculation unit 74 includes a difference image generation unit 101, a derivative image generation unit 102, a displacement initialization unit 103, a buffer 104, a displacement updating unit 105, and a displacement output unit 106.

The difference image generation unit 101 generates difference image data between the reference image data and the target image data. A value $I_{ti,j}$ of a position (i, j) on the difference image data is calculated using formula (6).

$$I_{ti,j} = \frac{1}{4}\{I_{i,j,1} - I_{i,j,0} + I_{i+1,j,1} - I_{i+1,j,0} + I_{i,j+1,1} - I_{i,j+1,0} + I_{i+1,j+1,1} - I_{i+1,j+1,0}\} \quad (6)$$

In formula (6), denotes a pixel value of the position (i, j) on the reference image data, and $I_{i,j,1}$ denotes a pixel value of the position (i, j) on the target image data.

The derivative image generation unit 102 generates an x-direction derivative image and a y-direction derivative image of the reference image data. An x-derivative $I_{xi,j}$ and a y-derivative $I_{yi,j}$ of the position (i, j) on the reference image data are calculated using formulas (7) and (8), respectively.

$$I_{xi,j} = \frac{1}{4}\{I_{i,j+1,0} - I_{i,j,0} + I_{i+1,j+1,0} - I_{i+1,j,0} + I_{i,j+1,1} - I_{i,j,1} + I_{i+1,j+1,1} - I_{i+1,j+1}\} \quad (7)$$

$$I_{yi,j} = \frac{1}{4}\{I_{i,j+1,0} - I_{i,j,0} + I_{i+1,j+1,0} - I_{i+1,j,0} + I_{i+1,j,1} - I_{i,j,1} + I_{i+1,j+1,1} - I_{i,j+1,1}\} \quad (8)$$

The displacement initialization unit 103 generates an initial value of a displacement amount to be calculated by repeated processing, and stores the generated initial value in the buffer 104. Data with no displacement amount in which u=0 and v=0 is used as the initial value of the displacement amount.

The buffer 104 is a buffer in which a displacement amount that is being calculated is stored during the repeated processing based on formula (5).

The displacement updating unit 105 updates the displacement amount that is being calculated which is stored in the buffer 104 based on formula (5) using the derivative image data generated by the derivative image generation unit 102 and the difference image data generated by the difference image generation unit 101.

The displacement output unit 106 outputs the displacement amount stored in the buffer 104 after the displacement updating unit 105 finishes repeating the processing a predetermined number of times.

Figure 14:
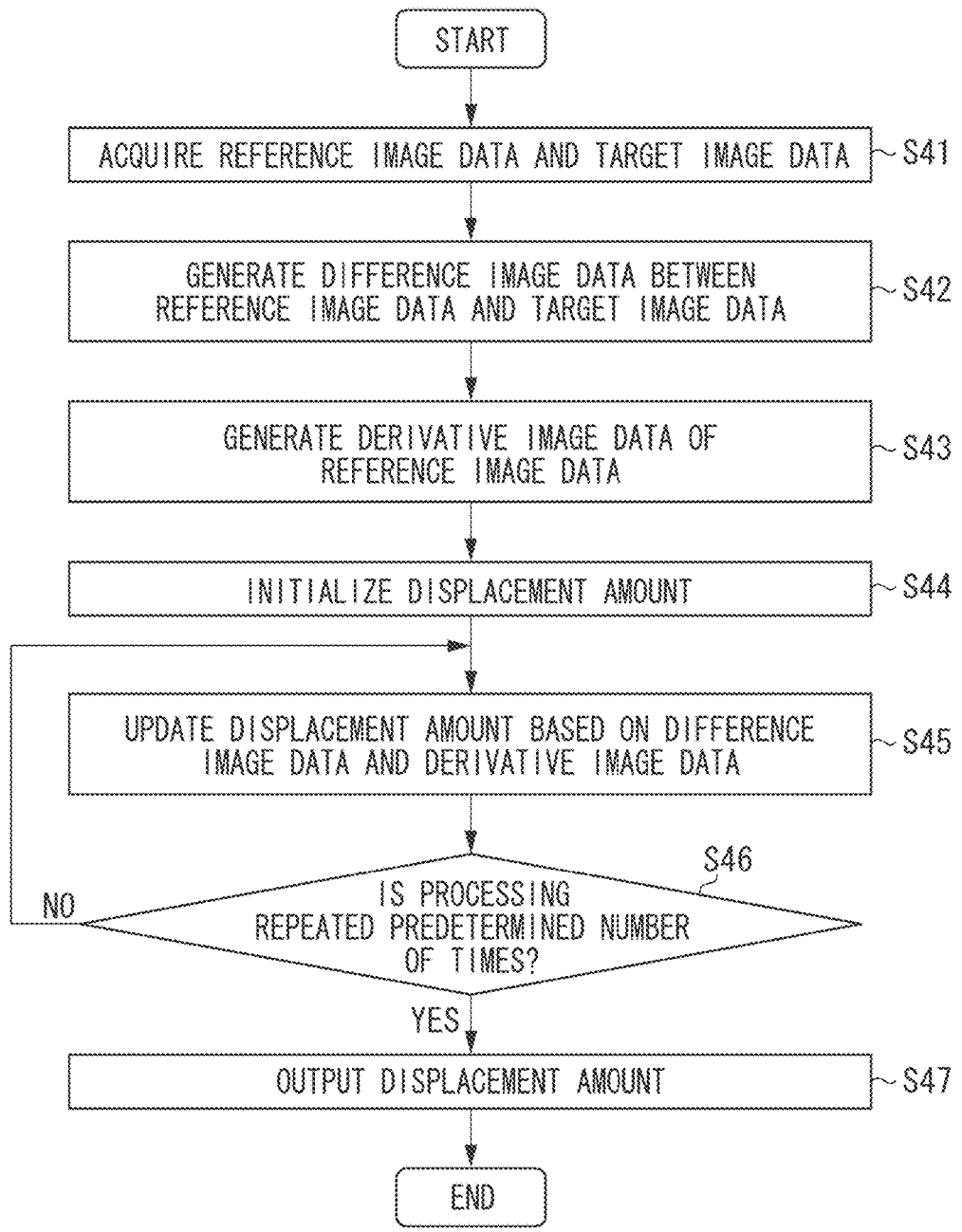
FIG. 14 is a flow chart illustrating displacement calculation processing.

The following describes an example of a process of calculating a displacement with reference to FIG. 14.

In step S41, the difference image generation unit 101 acquires the target image data and the reference image data.

In step S42, the difference image generation unit 101 generates difference image data between the target image data and the reference image data.

In step S43, the derivative image generation unit 102 generates x-derivative image data and y-derivative image data of the reference image data.

In step S44, the displacement initialization unit 103 initializes the displacement amount and stores the initialized displacement amount in the buffer 104.

In step S45, the displacement updating unit 105 updates the displacement amount stored in the buffer 104 based on the difference image data generated in step S41 and the derivative image data generated in step S42.

In step S46, whether the processing is repeated the predetermined number of times is determined. If the processing is not repeated the predetermined number of times (NO in step S46), the processing proceeds to step S45. On the other hand, if the processing is repeated the predetermined number of times (YES in step S46), the processing proceeds to step S47.

In step S47, the displacement output unit 106 outputs the displacement amount.

The displacement calculation method described in the present embodiment is a mere example, and any other method can be used to calculate displacements. For example, displacements can be calculated using a method in which block matching is performed on each region or a method in which a correspondence of feature points is interpolated to obtain a correspondence of pixel positions. Further, information in any form that defines a correspondence between pixels can be calculated.

<Configuration of Moving Object Determination Unit and Details of Processing>

The moving object determination unit 75 determines a region on the reference image data that contains a moving object, based on the reference image data, the fluctuation-corrected image data, and the moving speed data, and generates moving object map data.

Figure 15:
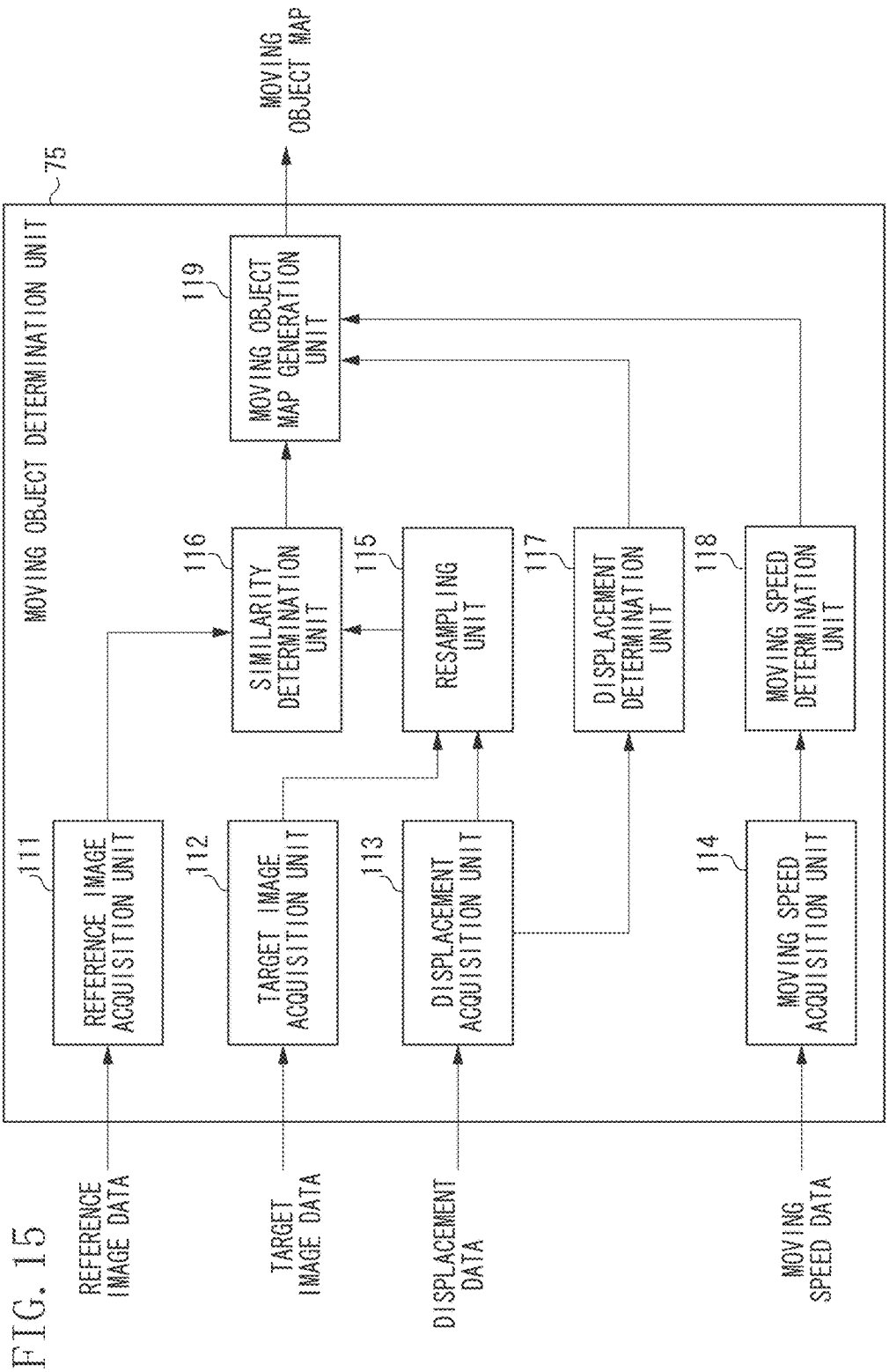
FIG. 15 is a block diagram illustrating an example of the configuration of a moving object determination unit.

FIG. 15 illustrates an example of the configuration of the moving object determination unit 75.

The moving object determination unit 75 includes a reference image acquisition unit 111, a target image acquisition unit 112, a displacement acquisition unit 113, a moving speed acquisition unit 114, a resampling unit 115, a similarity determination unit 116, a displacement determination unit 117, a moving speed determination unit 118, and a moving object map generation unit 119.

The reference image acquisition unit 111 acquires the reference image data from the reference image generation unit 73.

The target image acquisition unit 112 acquires the fluctuation-corrected image data as the alignment target image data from the neighborhood image fluctuation correction unit 72.

The displacement acquisition unit 113 acquires the displacement amount from the displacement calculation unit 74.

The moving speed acquisition unit 114 acquires the moving speed data from the neighborhood image fluctuation correction unit 72. The resampling unit 115 deforms and resamples the target image data based on the displacement amount such that the target image data coincides with the reference image data.

The similarity determination unit 116 determines a region (moving object region) containing a moving object based on a similarity between the deformed target image data and the reference image data.

A region containing no moving object is favorably aligned to match the reference image, whereas a region containing a moving object does not match the reference image to have a low similarity. Thus, the similarity determination unit 116 determines a region having a low similarity as a region containing a moving object. Any method can be used to calculate and determine the similarity. In the present embodiment, the sum of squares of differences of each channel is calculated for each pixel as an indicator of the similarity, and the similarity is determined using a threshold value $t_c$ such that a larger value of the indicator indicates a lower similarity. A moving object map $M_c$ generated by the similarity determination unit 116 is expressed by formula (9).

$$M_c(x) = \begin{cases} 1, & \|I_r(x) - I_t(x)\|_2^2 > t_c \\ 0, & \|I_r(x) - I_t(x)\|_2^2 \leq t_c \end{cases} \quad (9)$$

In formula (9), $I_r(x)$ denotes a pixel value of the reference image data in a pixel position x, and $I_t(x)$ denotes a pixel value of the target image data in the pixel position x.

The displacement determination unit 117 determines a region containing a moving object, based on the displacement amount. In a region containing a moving object, the reference image data and the target image data do not match, so alignment can fail to obtain an unreasonable displacement amount. Thus, the displacement determination unit 117 determines a region with a large displacement amount as a region containing a moving object.

Any method can be used to perform the determination based on a displacement amount. In the present embodiment, the absolute value of a displacement amount is calculated for each pixel, and the determination is performed using a threshold value $t_d$. A moving object map $M_d$ generated by the displacement determination unit 117 is as expressed by formula (10).

$$M_d(x) = \begin{cases} 1, & |d(x)| > t_d \\ 0, & |d(x)| \leq t_d \end{cases} \quad (10)$$

In formula (10), d(x) denotes a displacement amount vector in the pixel position x.

The moving speed determination unit 118 determines a region containing a moving object based on the moving speed data. If a moving object is contained, the moving speed increases. Thus, a region with a high moving speed is determined as a region containing a moving object.

Any method can be used to perform the determination based on the moving speed. In the present embodiment, the absolute value of a moving speed is calculated for each pixel, and the determination is performed using a threshold value $t_v$. A moving object map $M_v$ generated by the moving speed determination unit 118 is expressed as formula (11).

$$M_v(x) = \begin{cases} 1, & |v(x)| > t_v \\ 0, & |v(x)| \leq t_v \end{cases} \quad (11)$$

In formula (11), v(x) denotes a moving speed vector in the pixel position x.

The moving object map generation unit 119 combines together the moving object maps $M_c$, $M_d$, and $M_v$ generated by the similarity determination unit 116, the displacement determination unit 117, and the moving speed determination unit 118 to generate a final moving object map. In the present embodiment, a region determined as a region containing a moving object by any one of the similarity determination unit 116, the displacement determination unit 117, and the moving speed determination unit 118 is ultimately determined as a region containing a moving object. Specifically, a logical sum is calculated as specified by formula (12) is calculated to generate a moving object map M.

$$M = M_c \cup M_d \cup M_v \quad (12)$$

Figure 16:
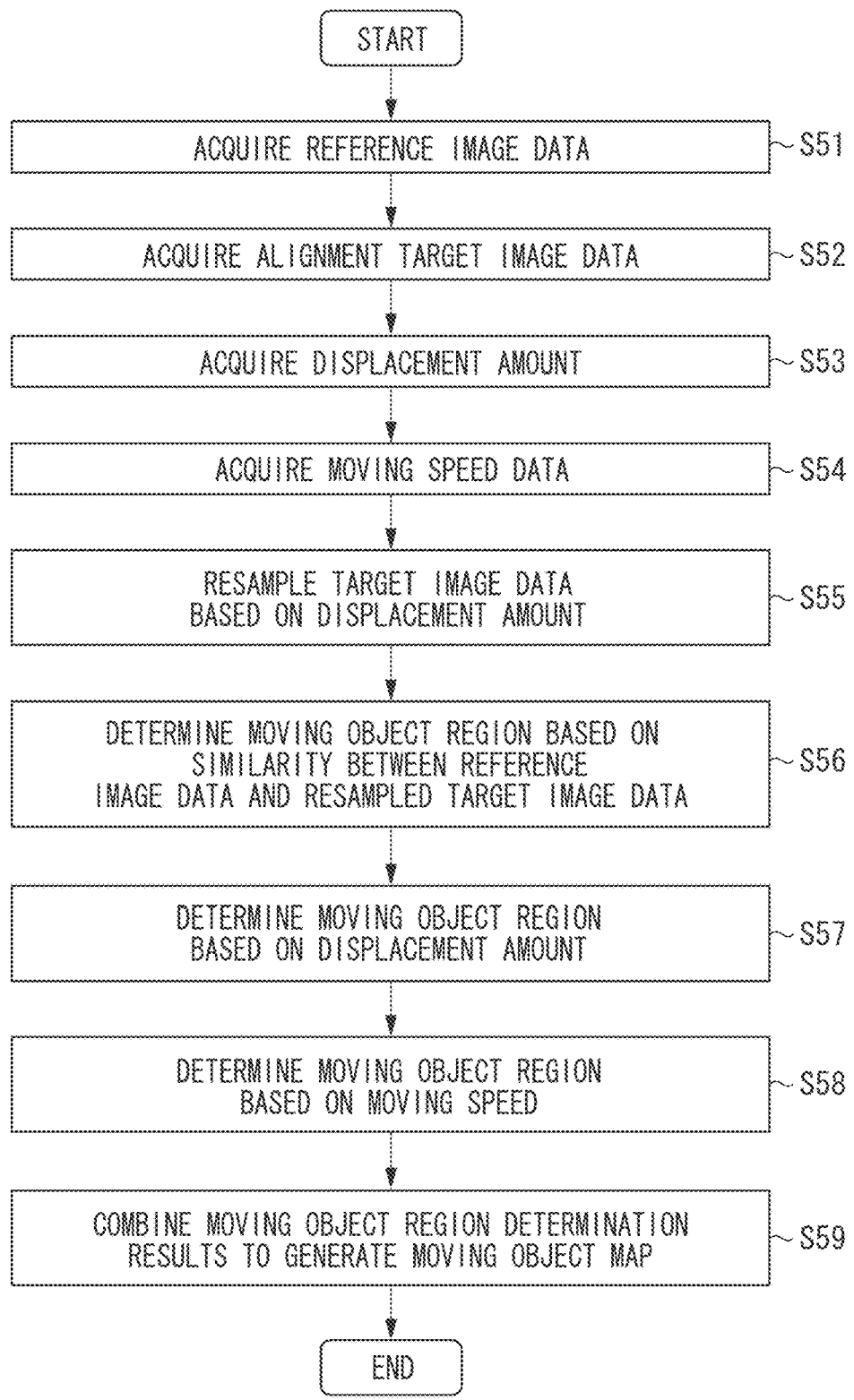
FIG. 16 is a flow chart illustrating moving object determination processing.

FIG. 16 illustrates an example of a process performed in the moving object determination unit 75.

In step S51, the reference image acquisition unit 111 acquires the reference image data.

In step S52, the target image acquisition unit 112 acquires the fluctuation-corrected image data as alignment target image data.

In step S53, the displacement acquisition unit 113 acquires the displacement amount.

In step S54, the moving speed acquisition unit 114 acquires the moving speed data.

In step S55, the resampling unit 115 deforms and resamples the target image data acquired in step S52 based on the displacement amount acquired in step S53 such that the target image data coincides with the reference image data.

In step S56, the similarity determination unit 116 determines a moving object region containing a moving object based on the similarity between the target image data resampled in step S55 and the reference image data acquired in step S51.

In step S57, the displacement determination unit 117 determines a moving object region containing a moving object based on the displacement amount acquired in step S53.

In step S58, the moving speed determination unit 118 determines a moving object region containing a moving object based on the moving speed acquired in step S54.

In step S59, the moving object map generation unit 119 combines results of the determinations performed in steps S56 to S58 to generate a moving object map.

The moving object determination method used in the present embodiment is a mere example, and any method capable of determining a region for which a displacement amount is unsuccessfully calculated can be used. For example, only a part of the determination method used in the present embodiment can be used.

<Configuration of Displacement Interpolation Unit and Details of Processing>

The displacement interpolation unit 76 interpolates an input displacement amount calculated by the displacement calculation unit 74 in a region determined as a moving object region on the moving object map generated by the moving object determination unit 75, and generates an interpolated output displacement amount. The interpolated displacements are calculated based on displacement amounts of regions other than the moving object region.

The interpolation of the displacement amount can be performed using any method by which the interpolated displacement amount is temporally and spatially smooth. In the present embodiment, the interpolated displacement amount is calculated by performing optimization processing to reduce the spatiotemporal Laplacians of components of x- and y-directions of the displacement amount. An interpolated displacement amount $D_{int}$ is calculated by minimizing an evaluation function E as expressed by formula (13).

$$E = \|f_{lap} * ((1-M) \cdot D_{dat} + M \cdot D_{int})\|_2^2 \quad (13)$$

In formula (13), M denotes a moving object map, $f_{lap}$ denotes a Laplacian filter, and $D_{dat}$ denotes a processing target component of the input displacement amount.

Figure 17:
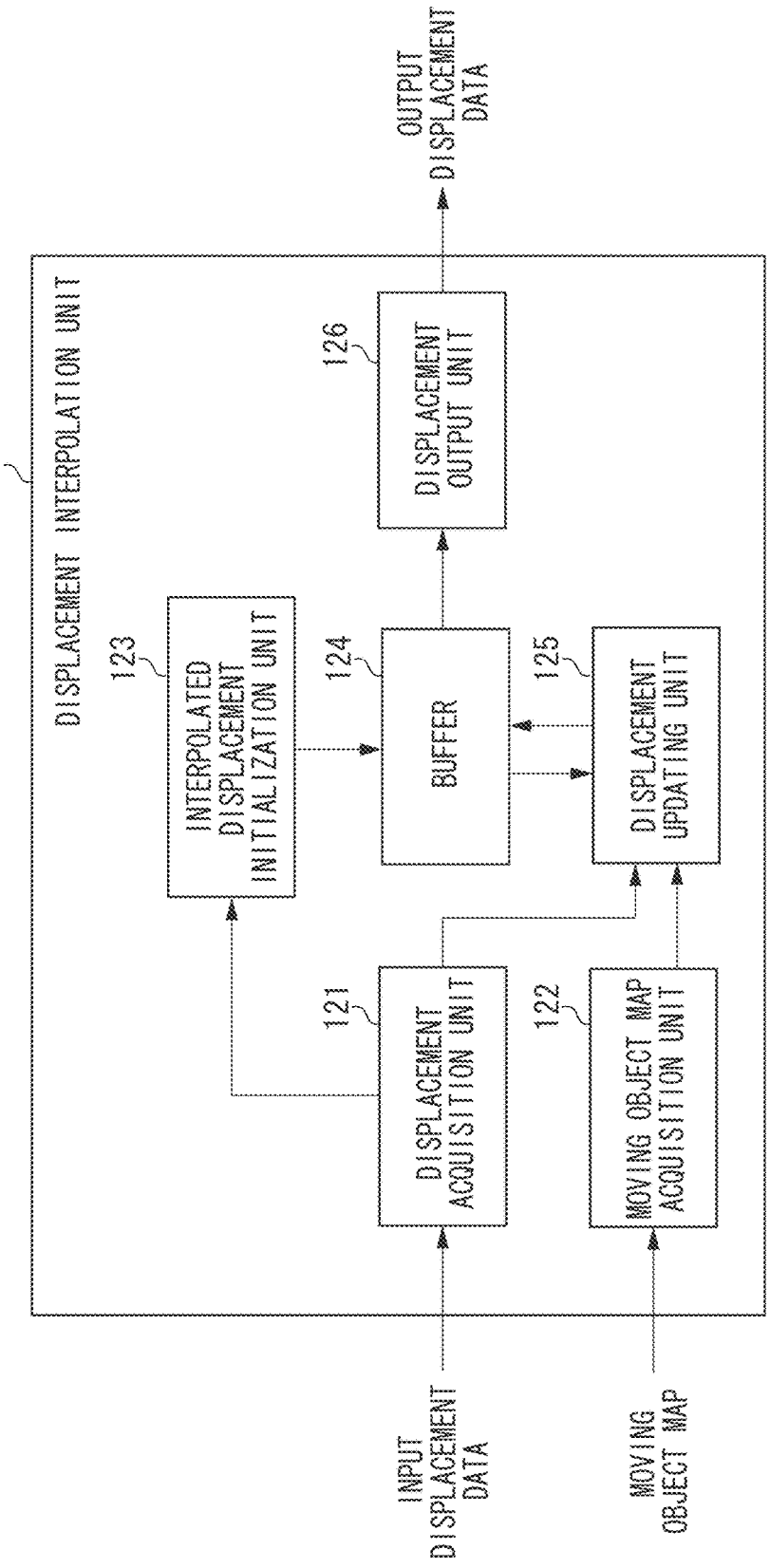
FIG. 17 is a block diagram illustrating an example of the configuration of a displacement interpolation unit.

FIG. 17 illustrates an example of the configuration of the displacement interpolation unit 76.

The displacement interpolation unit 76 includes a displacement acquisition unit 121, a moving object map acquisition unit 122, an interpolated displacement initialization unit 123, a buffer 124, a displacement updating unit 125, and a displacement output unit 126.

The displacement acquisition unit 121 acquires the displacement amount from the displacement calculation unit 74.

The moving object map acquisition unit 122 acquires the moving object map data from the moving object determination unit 75.

The interpolated displacement initialization unit 123 generates an initial value of the interpolated displacement amount generated by updating processing, and stores the initial value in the buffer 124.

While the input displacement amount is directly used in the present embodiment, a mean displacement amount of a neighborhood can be used, or hierarchical processing can be performed to generate an initial value from rough-scale output.

The buffer 124 holds the interpolated displacement amount.

The displacement updating unit 125 updates the interpolated displacement amount based on the displacement amount acquired by the displacement acquisition unit 121, the moving object map data acquired by the moving object map acquisition unit 122, and the interpolated displacement amount stored in the buffer 124, and stores a result of the updating in the buffer 124. This processing is repeated to generate a final interpolated displacement amount in the buffer 124. An amount of update is calculated analytically or by numerical calculation from formula (13) using a gradient descent method, conjugate gradient method, etc.

The displacement output unit 126 outputs the interpolated displacement amount stored in the buffer 124 as an output displacement amount to the resampling unit 77. Let the output displacement amount be denoted by $D_{out}$, a processing target component of the input displacement amount by $D_{dat}$, and the interpolated displacement amount by $D_{int}$. Then, formula (14) is obtained.

$$D_{OUT}=(1-M) \cdot D_{dat} + M \cdot D_{int} \qquad (14)$$

Figure 18:
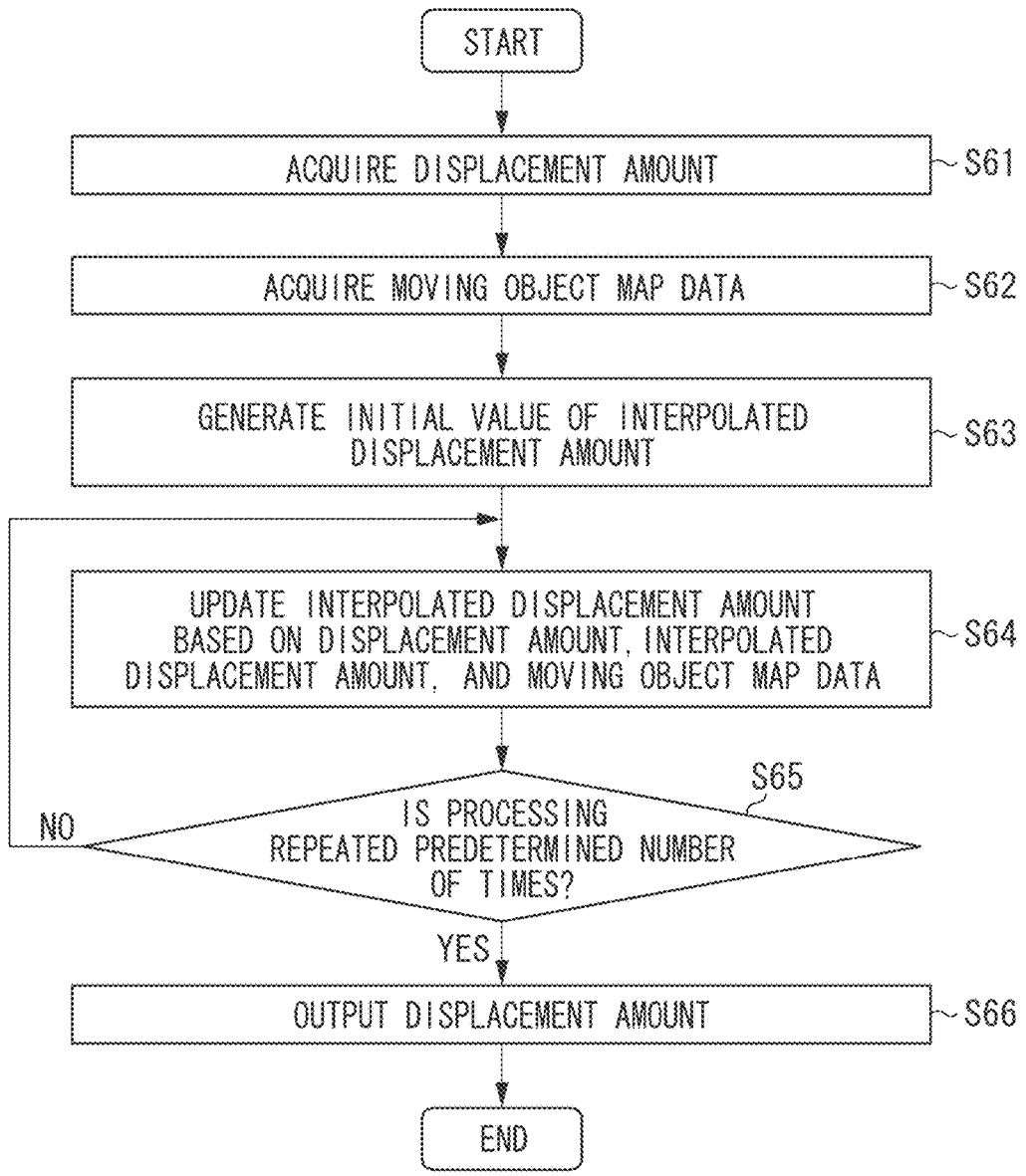
FIG. 18 is a flow chart illustrating displacement interpolation processing.

FIG. 18 illustrates an example of a process performed in the displacement interpolation unit 76.

In step S61, the displacement acquisition unit 121 acquires the displacement amount.

In step S62, the moving object map acquisition unit 122 acquires the moving object map data.

In step S63, the interpolated displacement initialization unit 123 generates an initial value of the interpolated displacement amount generated by updating processing.

In step S64, the displacement updating unit 125 updates the interpolated displacement amount based on the displacement amount acquired in step S61, the moving object map data acquired in step S62, and the interpolated displacement amount.

In step S65, the displacement updating unit 125 determines whether the processing is repeated a predetermined number of times. If a condition is not satisfied (NO in step S65), the processing returns to step S64 to continue the process. On the other hand, if the condition is satisfied (YES in step S65), the processing proceeds to step S66. The condition for terminating the processing can be based on a criterion other than the number of times of repeating.

In step S66, the displacement output unit 126 outputs the interpolated displacement amount as an output displacement amount.

In the present embodiment, as described above, a remaining fluctuation in an entire image is estimated by interpolating a fluctuation (remaining displacement amount) remaining after the neighborhood image fluctuation correction in a moving object region using the characteristic that a temporally low-frequency remaining fluctuation is also spatially low-frequency. Correction is performed according to the estimated remaining fluctuation to allow correction of remaining fluctuation of an entire image.

Thus, according to the present embodiment, a long-period fluctuation in image data containing a moving object is favorably corrected.

In the first embodiment, the amount of displacement between the reference image data and the image data to which neighborhood image fluctuation correction is applied is calculated, and resampling is performed to correct a remaining long-period fluctuation. In a second embodiment, a displacement amount 135 is further calculated using neighborhood image fluctuation correction based on displacement amount fitting.

Figure 19:
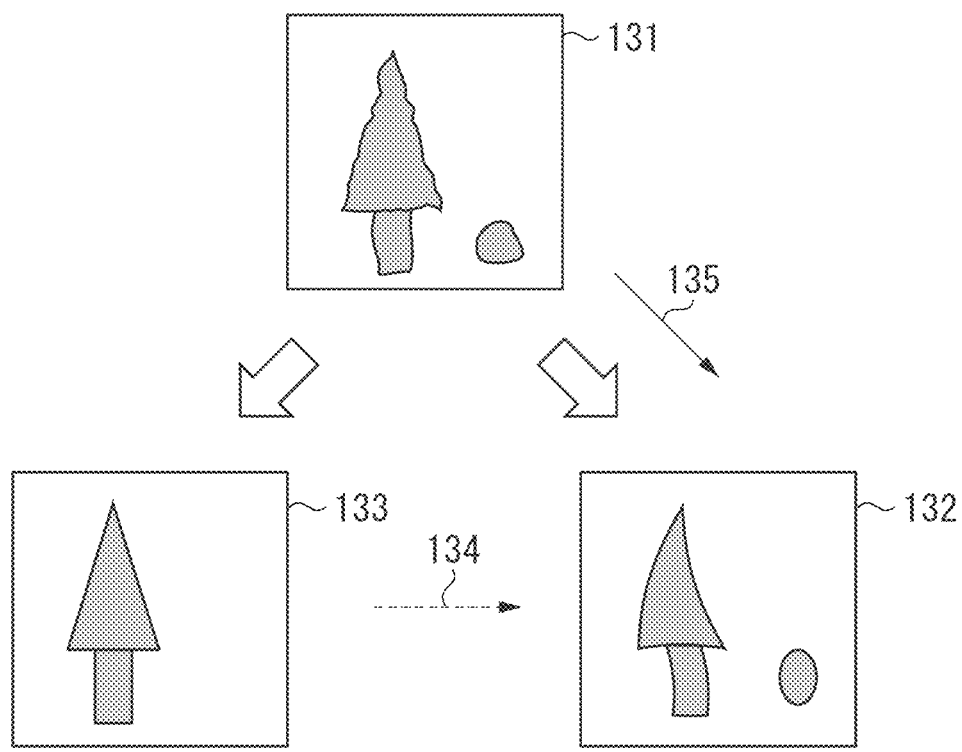
FIG. 19 conceptually illustrates remaining fluctuation correction processing according to a second embodiment.

FIG. 19 conceptually illustrates fluctuation correction processing according to the present embodiment.

In the present embodiment, a fluctuation-corrected image 132 and a reference image 133 are generated from an input image 131, and a displacement amount 134 between the reference image 133 and the fluctuation-corrected image 132 is calculated by alignment, as in the first embodiment. Further, in the present embodiment, neighborhood image fluctuation correction based on displacement amount fitting is used to further calculate the displacement amount 135. The displacement amount 135 is a remaining fluctuation, and interpolation processing is performed on the displacement amount 135. Let the displacement amount 134 in the pixel position x be denoted by $d_{res}(x)$, an interpolated $d_{res}(x)$ by $d'_{res}(x)$, and the displacement amount 135 by $d_{near}(x)$. Then, a displacement amount $d_{cor}(x)$ from a remaining-fluctuation-corrected image to the input image 131 can be combined as expressed by formula (15). The resampling unit 77 resamples the input image 131 based on the displacement amount door to generate a final fluctuation-corrected image.

$$d_{cor}(x)=d^{-1}_{near}\{d_{res}(x)+x\} \qquad (15)$$

Figure 20:
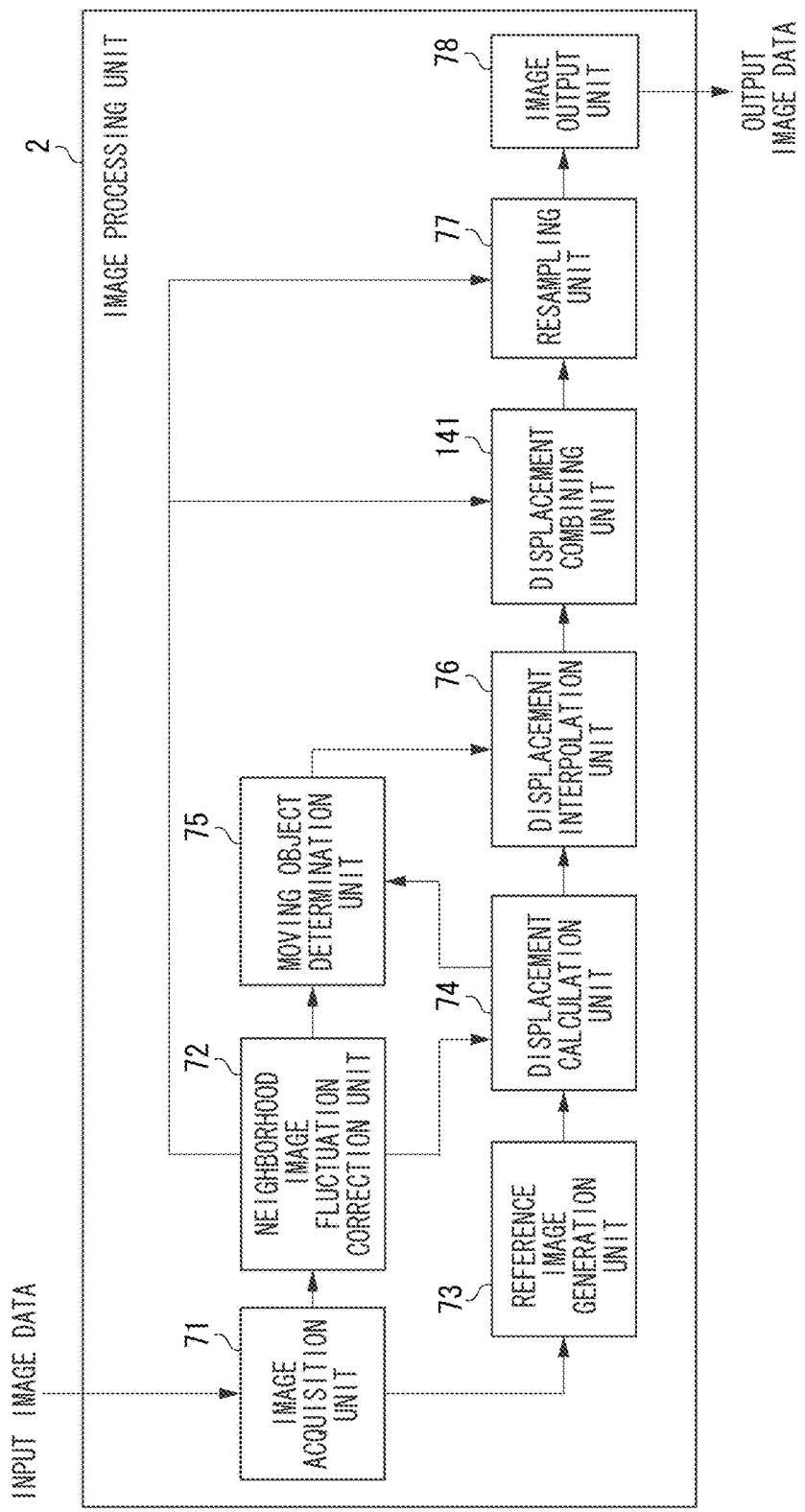
FIG. 20 is a block diagram illustrating an example of the configuration of an image processing unit according to the second embodiment.

FIG. 20 illustrates an example of the configuration of the image processing unit 2 according to the present embodiment. The image processing unit 2 further includes a displacement combining unit 141 in addition to the configuration illustrated in FIG. 7 according to the first embodiment. The displacement combining unit 141 combines displacement amounts according to formula (15).

Figure 21:
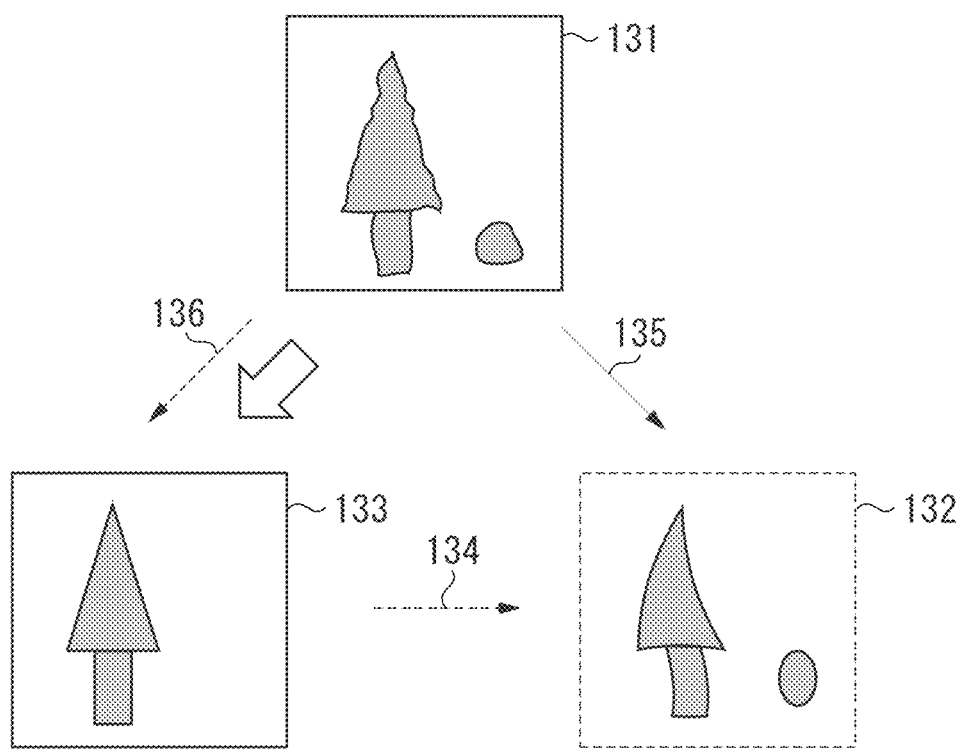
FIG. 21 conceptually illustrates remaining fluctuation correction processing according to a third embodiment.

In a third embodiment, as illustrated in FIG. 21, the reference image 133 is generated from the input image 131, but the fluctuation-corrected image 132 is not generated. A displacement amount 136 between the reference image 133 and the input image 131 is calculated by alignment. Further, the displacement amount 135 between a virtual fluctuation-corrected image 132 and the input image 131 is calculated using neighborhood image fluctuation correction. The displacement amount 134 between the reference image 133 and the virtual fluctuation-corrected image 132 is calculated by combining the displacement amounts 135 and 136 together.

Let the displacement amount 136 in the pixel position x be denoted by $d_{ref}(x)$, and the displacement amount 135 by $d_{near}(x)$. Then, a displacement amount $d_{res}(x)$ can be obtained by performing combining as specified by formula (16). Further, let the interpolated $d_{res}(x)$ be denoted by $d'_{res}(x)$. Then, the displacement amount $d_{cor}(x)$ from the remaining-fluctuation-corrected image to the input image 131 can be combined as expressed by formula (15). The resampling unit 77 resamples the input image 131 based on the displacement amount $d_{cor}$ to generate a final fluctuation-corrected image.

$$d_{res}(x)=d_{near}\{d^{-1}_{ref}(x)+x\} \qquad (16)$$

Figure 22:
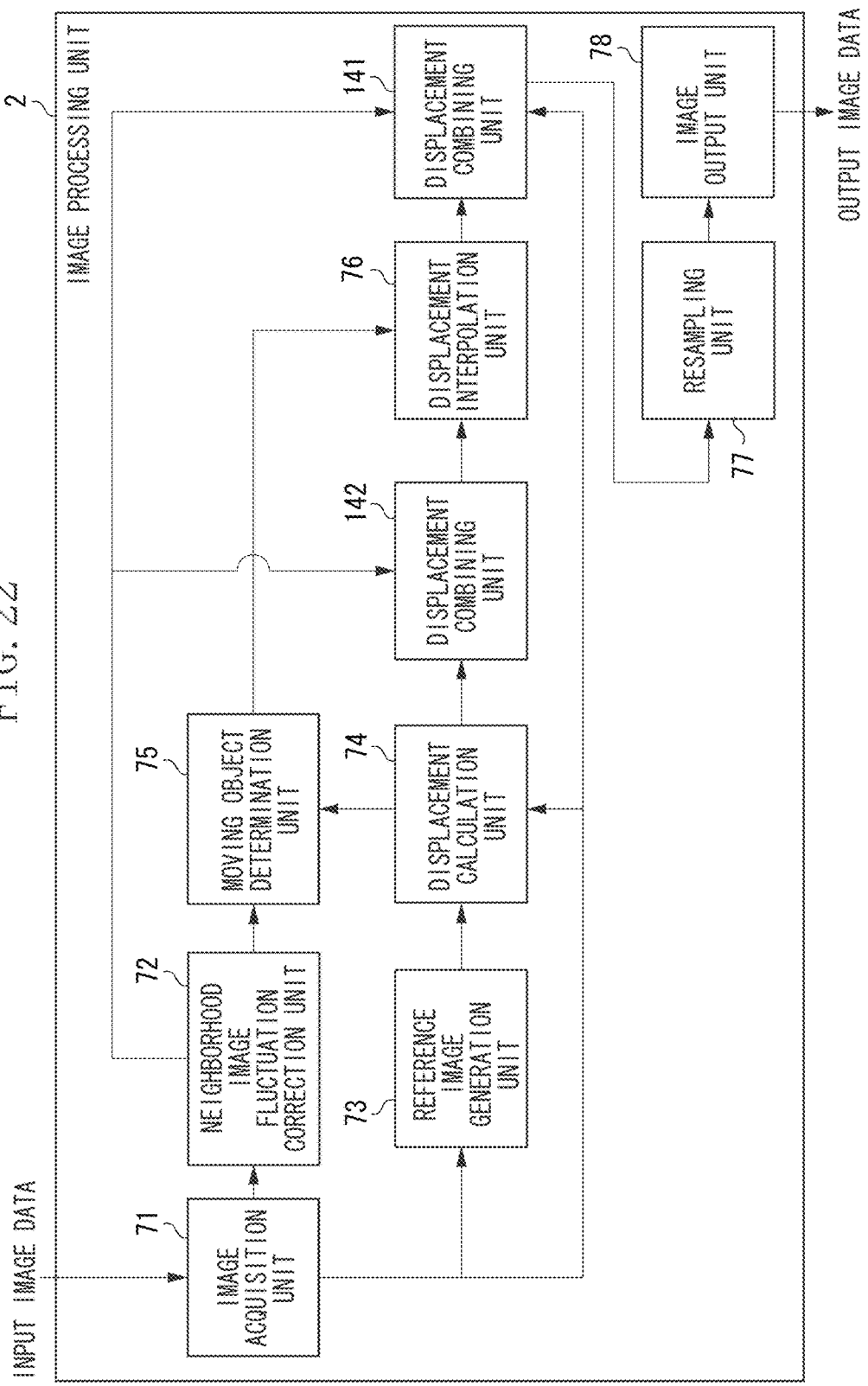
FIG. 22 is a block diagram illustrating an example of the configuration of an image processing unit according to the third embodiment.

FIG. 22 illustrates an example of the configuration of the image processing unit 2 according to the present embodiment. The displacement calculation unit according to the embodiment calculates an amount of displacement between the reference image data and the input image data. Further, the image processing unit 2 further includes the displacement combining unit 141 and a displacement combining unit 142 in addition to the configuration illustrated in FIG. 7 according to the first embodiment. The displacement combining unit 141 combines displacement amounts according to formula (15). The displacement combining unit 142 combines displacement amounts according to formula (16).

Figure 23:
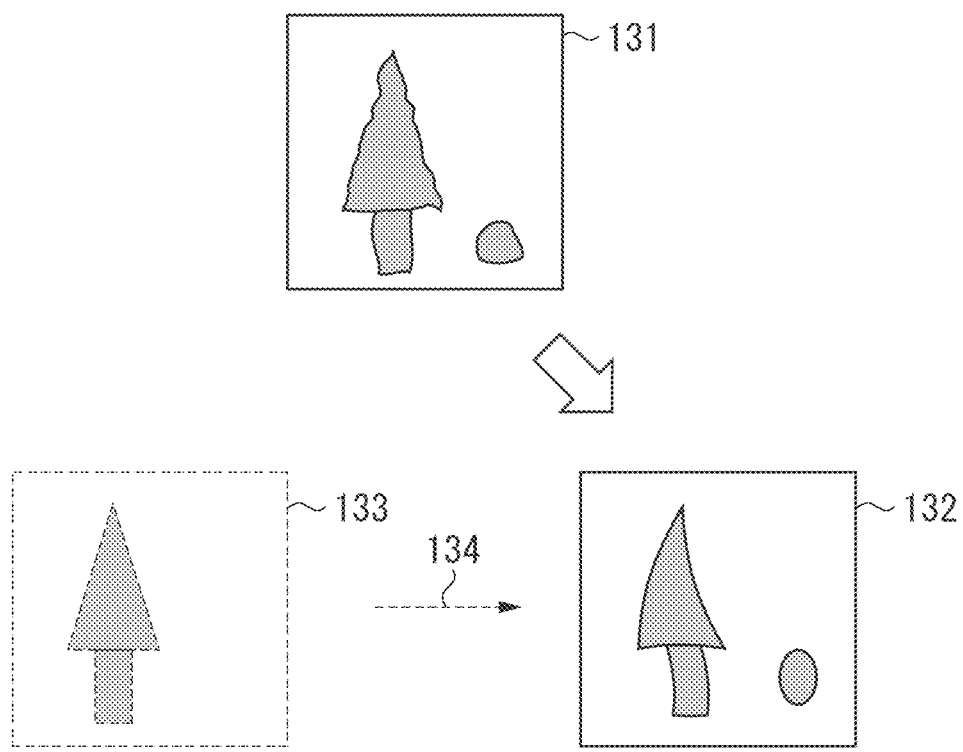
FIG. 23 conceptually illustrates remaining fluctuation correction processing according to a fourth embodiment.

In a fourth embodiment, as illustrated in FIG. 23, the fluctuation-corrected image 132 is generated from the input image 131, but the reference image 133 is not generated. A displacement amount of the fluctuation-corrected image 132 is calculated by alignment using one frame of the input image 131 or the fluctuation-corrected image 132 as a reference. A mean position of the displacement amount is calculated to calculate the displacement amount 134 between a virtual reference image 133 and the fluctuation-corrected image 132. Displacement amount interpolation processing and remaining fluctuation correction processing are performed as in the first embodiment using the calculated displacement amount 134. As in the second embodiment, the input image 131 can be deformed by performing resampling based on a displacement amount obtained by combining the displacement amounts 134 and 135 together.

Figure 24:
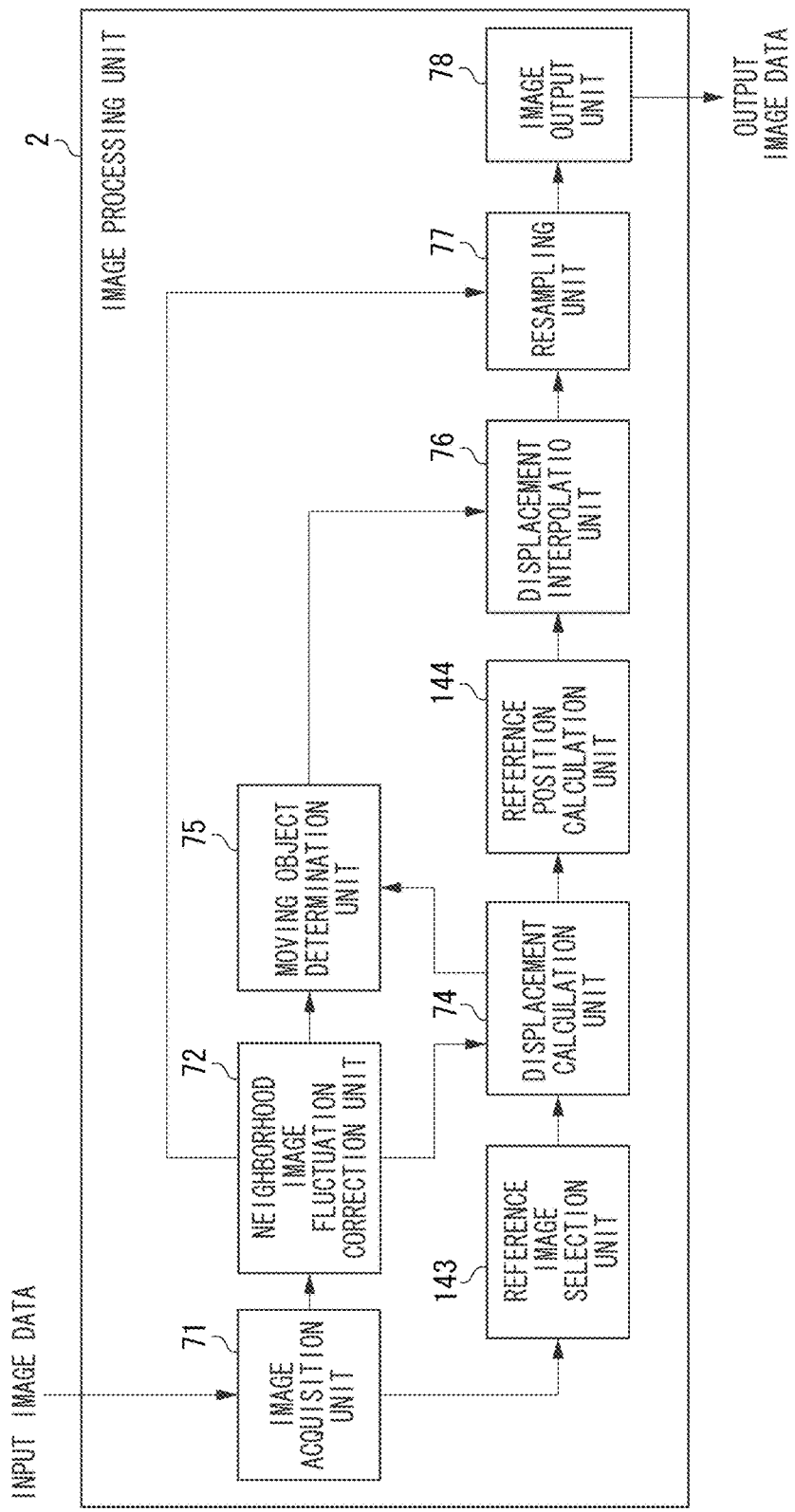
FIG. 24 is a block diagram illustrating an example of the configuration of an image processing unit according to the fourth embodiment.

FIG. 24 illustrates an example of the configuration of the image processing unit 2 according to the present embodiment. In the image processing unit 2, the reference image generation unit 73 according to the first embodiment is changed to a reference image selection unit 143. The reference image selection unit 143 selects one frame from input image data to use the selected frame as an alignment reference. Any frame can be used as the reference, and a predetermined frame can be used as the reference. Further, the image processing unit 2 further includes a reference position calculation unit 144 in addition to the configuration illustrated in FIG. 7 according to the first embodiment. The reference position calculation unit 144 calculates the displacement amount 134 by averaging, fitting, etc. from the displacement calculation unit 74.

In a fifth embodiment, the fluctuation-corrected image 132 and the reference image 133 are not generated. A displacement amount of the input image 131 is calculated by alignment using one frame of the input image 131 as a reference. A mean position of the displacement amount is calculated to calculate the displacement amount 135 between the virtual reference image 133 and the input image 131. Further, the displacement amount 136 between the virtual fluctuation-corrected image 132 and the input image 131 is calculated using neighborhood image fluctuation correction. Displacement amount interpolation processing and remaining fluctuation correction processing based on resampling are performed as in the third embodiment using the calculated displacement amounts 135 and 136.

The image processing unit 2 according to the present embodiment further includes the displacement combining unit 141, the reference image selection unit 143, and the displacement combining unit 142, which is provided immediately after the reference position calculation unit 144, in addition to the configuration illustrated in FIG. 7 according to the first embodiment. The displacement combining unit 141, the displacement combining unit 142, the reference image selection unit 143, and the reference position calculation unit 144 have similar functions to corresponding units in FIGS. 20, 22, and 24.

In the above-described examples, an amount of displacement from an image A (one piece of image data) to an image B (another piece of image data) can be replaced by an amount of displacement from the image B to the image A, and the amount of displacement can be reversed at the time of resampling or combining. This also realizes a similar function.

Embodiment Using Software

Embodiment(s) also can be realized by executing the following processing. Specifically, software (program) configured to realize functions of the above-described embodiments is supplied to a system or apparatus via a network or various storage mediums, and a computer (or CPU, micro processing unit (MPU), etc.) of the system or apparatus reads and executes the program. Further, embodiment(s) also can be realized by a circuit (e.g., application specific integrated circuit (ASIC)) configured to realize one or more functions. Further, processing according to two or more embodiments described above can be executed in combination.

According to the embodiments, a long-period fluctuation in image data containing a moving object can be favorably corrected.

Other Embodiments

Embodiment(s) also can be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2016-165671, filed Aug. 26, 2016, which is hereby incorporated by reference herein in its entirety.

What is claimed is:

1. An image processing apparatus comprising:
one or more processors; and
memory storing instructions that, when executed by the one or more processors, causes the image processing apparatus to perform operations including:
acquiring a plurality of pieces of image data obtained by temporally successively capturing images of an object,
obtaining, as a first correction, first correction data by performing fluctuation correction on processing target image data using a plurality of pieces of temporally neighboring image data among the acquired plurality of pieces of image data, calculating, as a first calculation and as first displacement data, an amount of displacement between reference image data and the processing target image data or reference image data and the first correction data, determining a moving object region contained in the plurality of pieces of image data based on the first correction data, the reference image data, and the first displacement data, calculating, as a second calculation and based on the first displacement data or the first correction data, second displacement data by interpolating the first displacement data in the determined moving object region, and obtaining, as a second correction, second correction data by correcting, based on the second displacement data, the processing target image data or the first correction data.

2. The image processing apparatus according to claim 1, wherein executing the instructions further causes the image processing apparatus to perform operations including generating the reference image data from the acquired plurality of pieces of image data, wherein generating includes generating the reference image data from a quantity of pieces of image data that is more than a quantity of the plurality of pieces of image data used to obtain the first correction data.

3. The image processing apparatus according to claim 2, wherein generating includes generating from the plurality of pieces of image data the reference image data in which a fluctuation is at rest.

4. The image processing apparatus according to claim 2, wherein generating includes generating the reference image data by applying a filter to time-series pixel values of the plurality of pieces of image data.

5. The image processing apparatus according to claim 2, wherein generating includes generating the reference image data by applying a filter to time-series displacement amounts of the plurality of pieces of image data.

6. The image processing apparatus according to claim 2, wherein the second calculation performs the interpolation such that the second displacement data is smooth in space-time.

7. The image processing apparatus according to claim 2, wherein the second calculation includes performing updating so as to reduce a Laplacian of the second displacement data.

8. The image processing apparatus according to claim 1, wherein executing the instructions further causes the image processing apparatus to perform operations including selecting one of the plurality of pieces of image data as the reference image data.

9. The image processing apparatus according to claim 1, wherein the second correction includes resampling, based on the second displacement data, the acquired plurality of pieces of image data or the first correction data.

10. The image processing apparatus according to claim 1, wherein the first calculation generates the first correction data by applying a filter to time-series pixel values of the plurality of pieces of image data.

11. The image processing apparatus according to claim 1, wherein the first calculation generates the first correction data by applying a filter to time-series displacement amounts of the plurality of pieces of image data.

12. A method for an image processing apparatus, the method comprising:

acquiring a plurality of pieces of image data obtained by temporally successively capturing images of an object;

obtaining, as a first correction, first correction data by performing fluctuation correction on processing target image data using a plurality of pieces of temporally neighboring image data among the acquired plurality of pieces of image data;

calculating, as a first calculation and as first displacement data, an amount of displacement between reference image data and the processing target image data or reference image data and the first correction data;

determining a moving object region contained in the plurality of pieces of image data based on the first correction data, the reference image data, and the first displacement data;

calculating, as a second calculation and based on the first displacement data or the first correction data, second displacement data by interpolating the first displacement data in the determined moving object region; and obtaining, as a second correction, second correction data by correcting, based on the second displacement data, the processing target image data or the first correction data.

13. A non-transitory computer-readable storage medium storing instructions that, when executed by a computer, cause the computer to perform a method for an image processing apparatus, the method comprising:

acquiring a plurality of pieces of image data obtained by temporally successively capturing images of an object;

obtaining, as a first correction, first correction data by performing fluctuation correction on processing target image data using a plurality of pieces of temporally neighboring image data among the acquired plurality of pieces of image data;

calculating, as a first calculation and as first displacement data, an amount of displacement between reference image data and the processing target image data or reference image data and the first correction data;

determining a moving object region contained in the plurality of pieces of image data based on the first correction data, the reference image data, and the first displacement data;

calculating, as a second calculation and based on the first displacement data or the first correction data, second displacement data by interpolating the first displacement data in the determined moving object region; and obtaining, as a second correction, second correction data by correcting, based on the second displacement data, the processing target image data or the first correction data.

* * * * *